US007839437B2

(12) United States Patent
Kasai et al.

(10) Patent No.: US 7,839,437 B2
(45) Date of Patent: Nov. 23, 2010

(54) IMAGE PICKUP APPARATUS, IMAGE PROCESSING METHOD, AND COMPUTER PROGRAM CAPABLE OF OBTAINING HIGH-QUALITY IMAGE DATA BY CONTROLLING IMBALANCE AMONG SENSITIVITIES OF LIGHT-RECEIVING DEVICES

(75) Inventors: Masanori Kasai, Kanagawa (JP); Yusuke Oike, Kanagawa (JP)

(73) Assignee: Sony Corporation, Tokyo (JP)

( * ) Notice: Subject to any disclaimer, the term of this patent is extended or adjusted under 35 U.S.C. 154(b) by 827 days.

(21) Appl. No.: 11/747,129

(22) Filed: May 10, 2007

(65) Prior Publication Data

US 2008/0012969 A1 Jan. 17, 2008

(30) Foreign Application Priority Data

May 15, 2006 (JP) ............................. P2006-134700

(51) Int. Cl.
*H04N 9/68* (2006.01)
*H04N 3/14* (2006.01)

(52) U.S. Cl. ................... 348/238; 348/224.1; 348/236; 348/273; 348/276; 348/279

(58) Field of Classification Search ................. 348/236, 348/238, 273, 276, 370
See application file for complete search history.

(56) References Cited

U.S. PATENT DOCUMENTS 5,323,233 A * 6/1994 Yamagami et al. .......... 348/277

| 5,414,465 | A | * | 5/1995 | Kodama et al. | 348/236 |
|---|---|---|---|---|---|
| 6,100,929 | A | * | 8/2000 | Ikeda et al. | 348/262 |
| 6,476,865 | B1 | * | 11/2002 | Gindele et al. | 348/277 |
| 6,611,289 | B1 | * | 8/2003 | Yu et al. | 348/265 |
| 7,088,392 | B2 | * | 8/2006 | Kakarala et al. | 348/272 |
| 7,663,679 | B2 | * | 2/2010 | Wada | 348/277 |
| 2005/0212924 | A1 | * | 9/2005 | Glenn | 348/222.1 |
| 2005/0248667 | A1 | * | 11/2005 | Schweng et al. | 348/234 |
| 2006/0139468 | A1 | * | 6/2006 | Wada | 348/272 |
| 2006/0221218 | A1 | * | 10/2006 | Adler et al. | 348/266 |

FOREIGN PATENT DOCUMENTS

JP 4-88784 3/1992

* cited by examiner

*Primary Examiner*—Ngoc-Yen T Vu
(74) *Attorney, Agent, or Firm*—Finnegan, Henderson, Farabow, Garrett & Dunner, L.L.P.

(57) ABSTRACT

An image pickup apparatus includes an image pickup device that has high-sensitivity pixel devices receiving a relatively large amount of light and low-sensitivity pixel devices receiving a relatively small amount of light, an exposure control unit independently controlling exposure periods of the high-sensitivity pixel devices and the low-sensitivity pixel devices, and an image generation unit performing image generation on the basis of an output signal of the image pickup device. The image generation unit compares a high-sensitivity pixel evaluation image generated using data output from the high-sensitivity pixel devices with a low-sensitivity pixel evaluation image generated using data output from the low-sensitivity pixel devices by obtaining a difference or ratio between pixel values of corresponding pixels in the two evaluation images, and performs different types of image processing for a region composed of pixels each having a small difference and a region composed of pixels each having a large difference.

23 Claims, 15 Drawing Sheets

FIG. 1A
(PRIOR ART)

| R | G | R | G |
|---|---|---|---|
| G | B | G | B |
| R | G | R | G |
| G | B | G | B |

FIG. 1B
(PRIOR ART)

| Y | R | Y | B |
|---|---|---|---|
| G | Y | G | Y |
| Y | B | Y | R |
| G | Y | G | Y |

FIG. 4

| G | W | G | W | G | W | G | W |
|---|---|---|---|---|---|---|---|
| W | B | W | R | W | B | W | R |
| G | W | G | W | G | W | G | W |
| W | R | W | B | W | R | W | B |
| G | W | G | W | G | W | G | W |
| W | B | W | R | W | B | W | R |
| G | W | G | W | G | W | G | W |
| W | R | W | B | W | R | W | B |

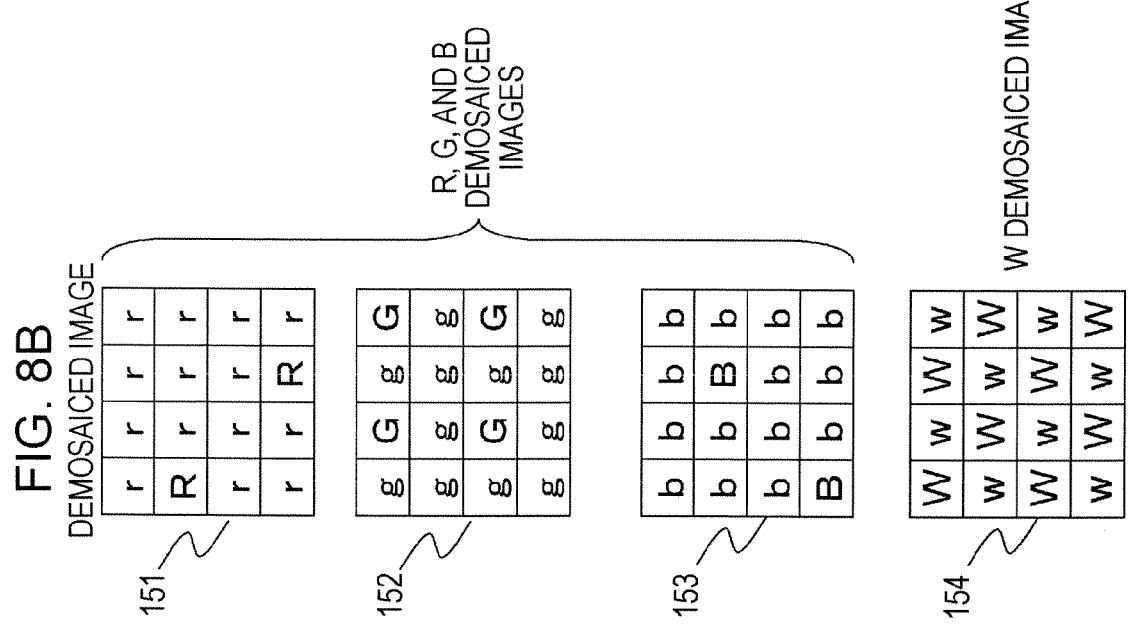

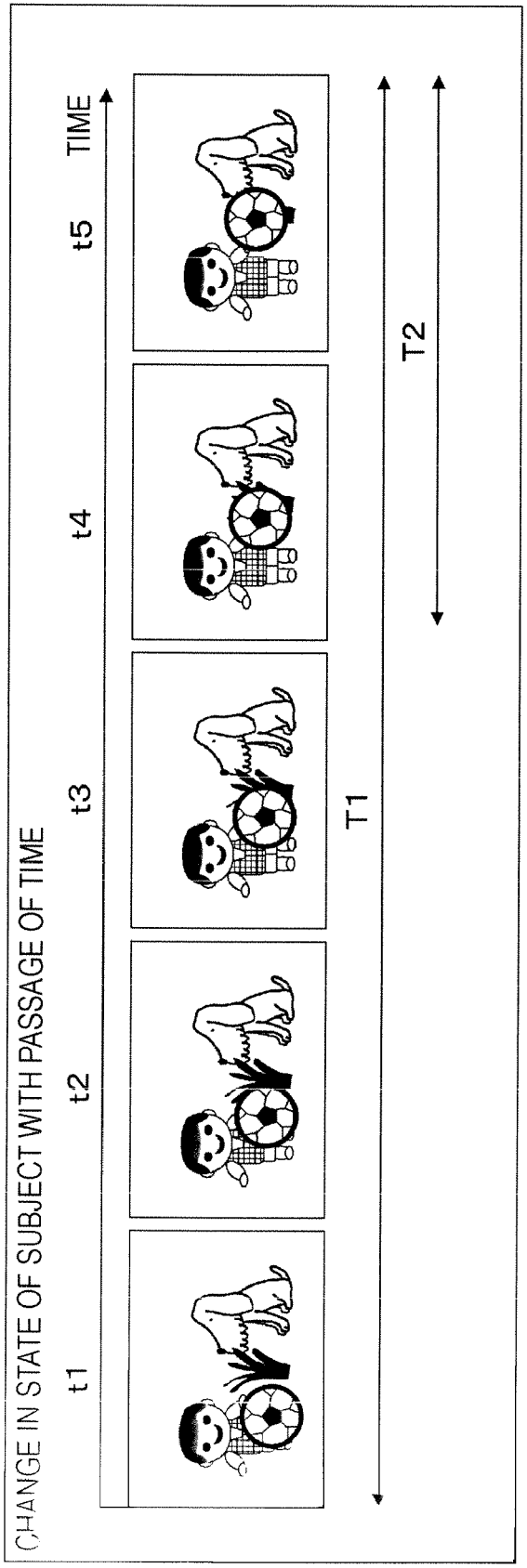
FIG. 9A CHANGE IN STATE OF SUBJECT WITH PASSAGE OF TIME
FIG. 9C IMAGE CAPTURED BY HIGH-SENSITIVITY DEVICE
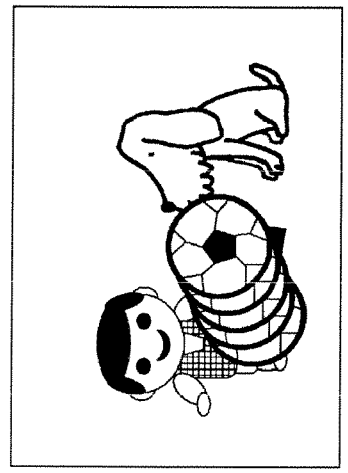
FIG. 9B IMAGE CAPTURED BY LOW-SENSITIVITY DEVICE

IMAGE PICKUP APPARATUS, IMAGE PROCESSING METHOD, AND COMPUTER PROGRAM CAPABLE OF OBTAINING HIGH-QUALITY IMAGE DATA BY CONTROLLING IMBALANCE AMONG SENSITIVITIES OF LIGHT-RECEIVING DEVICES

CROSS REFERENCES TO RELATED APPLICATIONS

The present invention contains subject matter related to Japanese Patent Application JP 2006-134700 filed in the Japanese Patent Office on May 15, 2006, the entire contents of which are incorporated herein by reference.

BACKGROUND OF THE INVENTION

1. Field of the Invention

The present invention relates to image pickup apparatuses, image processing methods, and computer programs, and, more particularly, to an image pickup apparatus for performing signal processing upon image pickup data obtained by a solid-state image pickup device, an image processing method, and a computer program.

2. Description of the Related Art

Typical single-plate color solid-state image pickup devices have a plurality of color filters disposed thereon. The color filter allows a specific wavelength component to pass therethrough and reach a pixel included in a solid-state image pickup device. A necessary color component is generated using a block of a plurality of pixels. A color arrangement of such color filters is, for example, as shown in FIG. 1A in which red (R), green (G), and blue (B) are used, or is, for example, as shown in FIG. 1B in which white (Y) corresponding to luminance signals, red (R), green (G), and blue (B) are used. Thus, in such single-plate color solid-state image pickup devices, each pixel obtains information about only a single color component. Accordingly, each pixel generates a necessary color component by performing interpolation using color information obtained from adjacent pixels. This process is called demosaicing.

A configuration of an image pickup apparatus provided with a single-plate color solid-state image pickup device is shown in FIG. 2. A single-plate color solid-state image pickup device 13 receives via a color filter 12 light incident from an optical lens 11, and photoelectrically converts the received light into an electric signal, and outputs the electric signal as an image signal. The image signal is converted into a digital image signal by an A/D converter (not shown). The digital image signal is subjected to clipping, gamma correction, white balance correction, and demosaicing in a camera signal processing unit 14, and is then transmitted to an image compression unit 15. The image compression unit 15 reduces the amount of data included in the image signal, converts the processed image signal into a predetermined image recording format, and then transmits the converted image data to a recording unit 16. The recording unit 16 records the received image data on a recording medium. Here, the image compression is not necessarily required to be performed. However, it is desirable that the image compression be performed so as to respond to the increasing number of pixels included in image pickup devices and the miniaturization of image pickup apparatuses.

Demosaicing performed on an image captured by a single-plate color solid-state image pickup device will be described with reference to FIG. 3. Single-plate color solid-state image pickup devices are configured to perform image capturing via primary color filters arranged using a color pattern such as the Bayer pattern (shown in FIG. 1A). In such single-plate color solid-state image pickup devices, each pixel obtains only a signal having a specific wavelength, that is, data of a color component having a specific wavelength. If a single-plate color solid-state image pickup device in which color filters are arranged in accordance with the Bayer pattern is used, the solid-state image pickup device outputs an image 20 that is a color mosaiced image in which each pixel has information about only one of R, G, and B colors.

A demosaicing unit 21 performs color interpolation for each pixel included in the image 20 so as to obtain data of all color components, that is, information about all of R, G, and B colors at each pixel.

First, a process of generating a G signal which is performed by the demosaicing unit 21 will be described. In the Bayer pattern shown in FIG. 1A, G signals are output from pixels arranged in a checkered pattern. At pixels that output no G signal in the image 20 output from the solid-state image pickup device, a G signal is generated by performing interpolation using G signals output from adjacent pixels. More specifically, a G signal (for example, $G_{11}$ shown in FIG. 3) is generated using the following equation.

$$G_{11}=(1/4)(G_{01}+G_{21}+G_{10}+G_{12})$$

Next, a process of generating R and B signals will be described. In the Bayer pattern shown in FIG. 1A, R signals are output from pixels arranged every other pixel row. Similarly, B signals are output from pixels arranged every other pixel row. For example, in the image 20 shown in FIG. 3 which has been output from the solid-state image pickup device, R signals are output from pixels in the top pixel row, but no B signals are output from pixels therein. In the second pixel row, B signals are output, but no R signals are output.

In each row where pixels that output R or B signals exist, R or B signals are output every two pixels. In the image 20 output from the solid-state image pickup device, if a pixel that outputs no R or B signal exists in a row including pixels that output R or B signals, interpolation of an R signal or a B signal (for example, $R_{01}$ or $B_{12}$) is performed for the pixel that outputs no R or B signal using one of the following equations. Consequently, an interpolated pixel value of the pixel is calculated.

$$R_{01}=(1/2)(R_{00}+R_{02})$$

$$B_{12}=(1/2)(B_{11}+B_{13})$$

Similarly, if a pixel that outputs no R or B signal exists in a column including pixels that output R or B signals, interpolation of an R signal or a B signal (for example, $R_{10}$ or $B_{21}$) is performed for the pixel using one of the following equations. Consequently, an interpolated pixel value of the pixel is calculated.

$$R_{10}=(1/2)(R_{00}+R_{20})$$

$$B_{21}=(1/2)(B_{11}+B_{31})$$

Furthermore, if a pixel that outputs no R or B signal exists in a row or column including pixels that output no R or B signals, interpolation of an R signal or B signal (for example, $R_{11}$ or $B_{22}$) is performed for the pixel that outputs no R or B signal using one of the following equations. Consequently, an interpolated pixel value of the pixel is calculated.

$$R_{11}=(1/4)(R_{00}+R_{02}+R_{20}+R_{22})$$

$$B_{22}=(1/4)(B_{11}+B_{13}+B_{31}+B_{33})$$

The demosaicing unit 21 performs the above-described color interpolation for all pixels, and outputs an R signal 22r, a G signal 22g, and a B signal 22b. The above-described color interpolation has been described by way of example, and the color interpolation may be performed in different manners using other correlations among color signals.

Currently, improvement in the quality of images captured by digital still cameras or movie cameras under low luminance conditions is an important issue. In order to capture an image under low luminance conditions, it is generally required that a shutter speed be lowered, a lens be used with a wide aperture, or an external visible light source such as a flash be used.

If a shutter speed is lowered, camera-shake occurs or a subject becomes out of focus. Furthermore, since the aperture ratio of a lens is limited, a brightness level corresponding to the limited aperture ratio is merely obtained. Still furthermore, if an external visible light source is used, the atmosphere of an image capturing location which has been created using a light disposed therein is undesirably changed.

For example, Japanese Unexamined Patent Application Publication No. 4-88784 and U.S. Pat. No. 5,323,233 disclose a signal processing method of obtaining a high-resolution image using an image pickup device provided with color filters arranged in accordance with the color pattern described previously with reference to FIG. 1B, that is, the Bayer pattern in which white (Y) corresponding to luminance signals, red (R), green (G), and blue (B) colors are used. Japanese Unexamined Patent Application Publication No. 4-88784 describes a signal processing method of achieving a high-resolution using a color filter array shown in FIG. 1B in which white pixels are arranged in a checkered pattern.

That is, according to the color filter array shown in FIG. 1B, a signal can be obtained which has a value larger than a signal value obtained when the color filter array shown in FIG. 1A, in which green (G) pixels are arranged in a checkered pattern, is used, because the white (Y) pixels arranged in a checkered pattern have sensitivity over the entire visible light range. Consequently, an image having a good signal-to-noise ratio can be obtained.

However, if the same exposure period is set for light-receiving devices corresponding to the white (Y), red (R), green (G), and blue (B) pixels, the light-receiving devices corresponding to the white (Y) pixels receive a larger amount of light compared with the light-receiving devices corresponding to the red (R), green (G), and blue (B) pixels. In such a color filter array, if the amount of light is controlled so that one type of light-receiving device can receive an appropriate amount of light, the other types of light-receiving devices cannot receive an appropriate amount of light.

Furthermore, if an exposure period suitable for one type of light-receiving device is set for the other types of light-receiving devices, the other types of light-receiving devices cannot receive an appropriate amount of light. For example, if an exposure period is set so that one type of light-receiving device does not become saturated, the other types of light-receiving devices cannot obtain sufficient signal charges. This leads to a poor signal-to-noise ratio. On the other hand, if an exposure period is set so that all types of light-receiving devices can obtain sufficient signal charges, the one type of light-receiving device becomes saturated.

SUMMARY OF THE INVENTION

It is desirable to provide an image pickup apparatus and an image processing method capable of obtaining high-quality image data by controlling imbalance among sensitivities of light-receiving devices arranged in an image pickup device which receive different light components, and a computer program.

An image pickup apparatus according to an embodiment of the present invention includes: an image pickup device having a plurality of high-sensitivity pixel devices that receive a relatively large amount of light and a plurality of low-sensitivity pixel devices that receive a relatively small amount of light, the high-sensitivity pixel devices and the low-sensitivity pixel devices being arranged in an array; an exposure control unit configured to independently control an exposure period of the high-sensitivity pixel devices and an exposure period of the low-sensitivity pixel devices, the high-sensitivity pixel devices and the low-sensitivity pixel devices being included in the image pickup device; an image generation unit configured to perform image generation processing on the basis of a signal output from the image pickup device. The image generation unit performs comparison processing of a high-sensitivity pixel evaluation image generated using data output from the high-sensitivity pixel devices and a low-sensitivity pixel evaluation image generated using data output from the low-sensitivity pixel devices by obtaining a difference or ratio between a pixel value of each pixel included in the high-sensitivity pixel evaluation image and a pixel value of a corresponding pixel included in the low-sensitivity pixel evaluation image, discriminates a pixel region composed of pixels each having a small difference between corresponding pixels in the two evaluation images from a pixel region composed of pixels each having a large difference between corresponding pixels in the two evaluation images, and performs different types of image processing for the pixel regions.

In the image pickup apparatus according to an embodiment of the present invention, the image generation unit generates an image for the pixel region composed of pixels each having a small difference between corresponding pixels in the two evaluation images by performing image processing using both of the data output from the high-sensitivity pixel devices and the data output from the low-sensitivity pixel devices, and generates an image for the pixel region composed of pixels each having a large difference between corresponding pixels in the two evaluation images by performing image processing using only one of the data output from the high-sensitivity pixel devices and the data output from the low-sensitivity pixel devices.

In the image pickup apparatus according to an embodiment of the present invention, each of the low-sensitivity pixel devices included in the image pickup device is configured to receive light in an R, G, or B specific wavelength range, and each of the high-sensitivity pixel devices included in the image pickup device is configured to receive light in a visible light range. Furthermore, when it is assumed that an evaluation image generated using data output from the low-sensitivity pixel devices is a low-sensitivity pixel evaluation image WL and an evaluation image generated using data output from the high-sensitivity pixel devices is a high-sensitivity pixel evaluation image WH, the image generation unit generates the low-sensitivity pixel evaluation image WL on the basis of equation WL=aR+bG+cB, where coefficients a, b, and c function as parameters and are determined in accordance with characteristics of the image pickup device.

In the image pickup apparatus according to an embodiment of the present invention, the image generation unit determines values of the parameters in accordance with a light source.

In the image pickup apparatus according to an embodiment of the present invention, the image generation unit compares an absolute value |E| of a difference between pixel values of corresponding pixels in the high-sensitivity pixel evaluation image and the low-sensitivity pixel evaluation image with a predetermined threshold value, and performs different types of image processing for a pixel region composed of pixels each having a pixel value difference larger than the threshold value and a pixel region composed of pixels each having a pixel value difference equal to or smaller than the threshold value.

In the image pickup apparatus according to an embodiment of the present invention, the image generation unit compares an absolute value |E| of a difference between pixel values of corresponding pixels in the high-sensitivity pixel evaluation image and the low-sensitivity pixel evaluation image with a plurality of predetermined threshold values, and performs different types of image processing in accordance with degrees of difference among a pixel value difference and the threshold values.

In the image pickup apparatus according to an embodiment of the present invention, the image generation unit performs different types of image processing in accordance with degrees of difference among a pixel value difference and the threshold values by using the data output from the high-sensitivity pixel devices and the data output from the low-sensitivity pixel devices at different ratios.

In the image pickup apparatus according to an embodiment of the present invention, the image generation unit removes high-frequency components from the high-sensitivity pixel evaluation image and the low-sensitivity pixel evaluation image prior to the comparison processing of them.

In the image pickup apparatus according to an embodiment of the present invention, the image generation unit generates an image for a pixel region composed of a pixel having a large difference between pixel values of corresponding pixels in the two evaluation images and pixels around the pixel by performing image processing using only one of the data output from the high-sensitivity pixel devices and the data output from the low-sensitivity pixel devices.

In the image pickup apparatus according to an embodiment of the present invention, the image generation unit performs comparison processing of the high-sensitivity pixel evaluation image generated using data that has yet to be subjected to interpolation processing and the low-sensitivity pixel evaluation image generated using data that has yet to be subjected to interpolation processing.

In the image pickup apparatus according to an embodiment of the present invention, the high-sensitivity pixel devices included in the image pickup device receive visible light and invisible light such as infrared light.

An image processing method of performing image processing in an image pickup apparatus according to an embodiment of the present invention includes the steps of: using an image pickup device having a plurality of high-sensitivity pixel devices that receive a relatively large amount of light and a plurality of low-sensitivity pixel devices that receive a relatively small amount of light, independently controlling an exposure period of the high-sensitivity pixel devices and an exposure period of the low-sensitivity pixel devices at the time of image capturing, and inputting an image capturing signal output from the image pickup device into an image generation unit; causing the image generation unit to perform comparison processing of a high-sensitivity pixel evaluation image generated using data output from the high-sensitivity pixel devices and a low-sensitivity pixel evaluation image generated using data output from the low-sensitivity pixel devices by obtaining a difference or ratio between a pixel value of each pixel included in the high-sensitivity pixel evaluation image and a pixel value of a corresponding pixel included in the low-sensitivity pixel evaluation image; and causing the image generation unit to discriminate a pixel region composed of pixels each having a small difference between corresponding pixels in the two evaluation images from a pixel region composed of pixels each having a large difference between corresponding pixels in the two evaluation images, and perform different types of image processing for the pixel regions.

In the image processing method according to an embodiment of the present invention, image processing is performed for the pixel region composed of pixels each having a small difference between corresponding pixels in the two evaluation images using both of the data output from the high-sensitivity pixel devices and the data output from the low-sensitivity pixel devices, and image processing is performed for the pixel region composed of pixels each having a large difference between corresponding pixels in the two evaluation images using only one of the data output from the high-sensitivity pixel devices and the data output from the low-sensitivity pixel devices.

In the image processing method according to an embodiment of the present invention, each of the low-sensitivity pixel devices included in the image pickup device is configured to receive light in an R, G, or B specific wavelength range, and each of the high-sensitivity pixel devices included in the image pickup device is configured to receive light in a visible light range. Furthermore, when it is assumed that an evaluation image generated using data output from the low-sensitivity pixel devices is a low-sensitivity pixel evaluation image WL and an evaluation image generated using data output from the high-sensitivity pixel devices is a high-sensitivity pixel evaluation image WH, the image generation unit generates the low-sensitivity pixel evaluation image WL on the basis of equation $WL = aR + bG + cB$, where coefficients a, b, and c function as parameters and are determined in accordance with characteristics of the image pickup device.

In the image processing method according to an embodiment of the present invention, the image generation unit determines values of the parameters in accordance with a light source so as to generate the low-sensitivity pixel evaluation image WL.

In the image processing method according to an embodiment of the present invention, an absolute value |E| of a difference between pixel values of corresponding pixels in the high-sensitivity pixel evaluation image and the low-sensitivity pixel evaluation image is compared with a predetermined threshold value, and different types of image processing is performed for a pixel region composed of pixels each having a pixel value difference larger than the threshold value and a pixel region composed of pixels each having a pixel value difference equal to or smaller than the threshold value.

In the image processing method according to an embodiment of the present invention, an absolute value |E| of a difference between pixel values of corresponding pixels in the high-sensitivity pixel evaluation image and the low-sensitivity pixel evaluation image is compared with a plurality of predetermined threshold values, and different types of image processing is performed in accordance with degrees of difference among a pixel value difference and the threshold values.

In the image processing method according to an embodiment of the present invention, different types of image processing is performed in accordance with degrees of difference among a pixel value difference and the threshold values by using the data output from the high-sensitivity pixel devices and the data output from the low-sensitivity pixel devices at different ratios.

In the image processing method according to an embodiment of the present invention, high-frequency components are removed from the high-sensitivity pixel evaluation image and the low-sensitivity pixel evaluation image prior to the comparison processing of them.

In the image processing method according to an embodiment of the present invention, image generation processing is performed for a pixel region composed of a pixel having a large difference between pixel values of corresponding pixels in the two evaluation images and pixels around the pixel by performing image processing using only one of the data output from the high-sensitivity pixel devices and the data output from the low-sensitivity pixel devices.

In the image processing method according to an embodiment of the present invention, comparison processing of the high-sensitivity pixel evaluation image generated using data that has yet to be subjected to interpolation processing and the low-sensitivity pixel evaluation image generated using data that has yet to be subjected to interpolation processing is performed.

In the image processing method according to an embodiment of the present invention, the high-sensitivity pixel devices included in the image pickup device receive visible light and invisible light such as infrared light.

A computer program according to an embodiment of the present invention causing an image pickup apparatus to perform image processing including the steps of: under the control of a control unit, using an image pickup device having a plurality of high-sensitivity pixel devices that receive a relatively large amount of light and a plurality of low-sensitivity pixel devices that receive a relatively small amount of light, independently controlling an exposure period of the high-sensitivity pixel devices and an exposure period of the low-sensitivity pixel devices at the time of image capturing, and inputting an image capturing signal output from the image pickup device into an image generation unit; causing the image generation unit to perform comparison processing of a high-sensitivity pixel evaluation image generated using data output from the high-sensitivity pixel devices and a low-sensitivity pixel evaluation image generated using data output from the low-sensitivity pixel devices by obtaining a difference or ratio between a pixel value of each pixel included in the high-sensitivity pixel evaluation image and a pixel value of a corresponding pixel included in the low-sensitivity pixel evaluation image; and causing the image generation unit to discriminate a pixel region composed of pixels each having a small difference between corresponding pixels in the two evaluation images from a pixel region composed of pixels each having a large difference between corresponding pixels in the two evaluation images, and perform different types of image processing for the pixel regions.

Here, a computer program according to an embodiment of the present invention can be provided to, for example, a versatile computer system capable of executing various program codes via a computer-readable storage medium such as a CD, an FD, or an MO, or a communication medium such as a network. By providing such a program to the computer system in a computer-readable format, processing corresponding to the program is performed in the computer system.

Other objects, characteristics, and advantages of the present invention will become apparent from more detailed descriptions based on the following embodiments of the present invention and the accompanying drawings. In this specification, a system means a logical group of a plurality of apparatuses. These apparatuses may not be in a single cabinet.

In an image pickup apparatus according to an embodiment of the present invention, image processing is performed as follows. An RGBW image pickup device, that is, an image pickup device including devices for low-sensitivity pixels (R, G, and B light-receiving devices) and devices for high-sensitivity pixels (W light-receiving devices) is used. A long exposure period is set for the devices for low-sensitivity pixels, and a short exposure period is set for the devices for high-sensitivity pixels. An evaluation image generated using only data obtained by the devices for low-sensitivity pixels (the R, G, and B light-receiving devices) is compared with an evaluation image generated using only data obtained by the devices for high-sensitivity pixels (the W light-receiving devices). For a pixel region having a large difference between them, image generation processing is performed using only one of the evaluation images. On the other hand, for a pixel region having a small difference between them, image generation processing is performed using both of the evaluation images. In a known image pickup apparatus, differences between exposure periods of light-receiving devices cause differences between images to be mixed in a region corresponding to the movement of a subject. Consequently, errors occur at the time of image mixing. However, in an image pickup apparatus according to an embodiment of the present invention, the occurrence of such errors can be prevented and a high-quality image can be obtained.

BRIEF DESCRIPTION OF THE DRAWINGS

FIGS. 1A and 1B are diagrams describing the Bayer pattern used to arrange typical color filters;

FIG. 4 is a diagram describing a color pattern used for an image pickup device according to an embodiment of the present invention;

FIGS. 8A and 8B are diagrams describing mosaiced images and demosaiced images;

FIGS. 9A to 9C are diagrams describing a phenomenon that occurs due to a difference between exposure periods;

DESCRIPTION OF THE PREFERRED EMBODIMENTS

An image pickup apparatus and an image processing method according to an embodiment of the present invention, and a computer program will be described with reference to the accompanying drawings in the following order.
1. Exemplary Image Pickup Data Processing Using an RGBW Image Pickup Device and Problems Thereof
2. Image Processing According to an Embodiment of the Present Invention
  2.1 Outline
  2.2 Details of Evaluation Image Generation Processing
  2.3 Details of Evaluation Image Comparison Processing
3. Other Embodiments
  3.1 Control of Evaluation Image
  3.2 Control of Unit of Image Processing
  3.3 Control of Range of Evaluation Image Comparison Processing
  3.4 Optimum Control Based on a Difference between Pixel Values 1. Exemplary Image Pickup Data Processing Using an RGBW Image Pickup Device and Problems Thereof First, exemplary image pickup data processing performed using an RGBW image pickup device and problems thereof will be described. An image pickup device used in an image pickup apparatus according to an embodiment of the present invention has, for example, a color pattern shown in FIG. 4. That is, the image pickup device has filters having four types of spectral characteristics, a red (R) channel transparent to light having a wavelength in the vicinity of a wavelength corresponding to a red color, a green (G) channel transparent to light having a wavelength in the vicinity of a wavelength corresponding to a green color, a blue (B) channel transparent to light having a wavelength in the vicinity of a wavelength corresponding to a blue color, and a white (W) channel transparent to light having a wavelength corresponding to any of red, green, and blue colors. According to the RGBW image pickup device, a mosaiced image including the four types of different spectral characteristics can be obtained.

Figure 5:
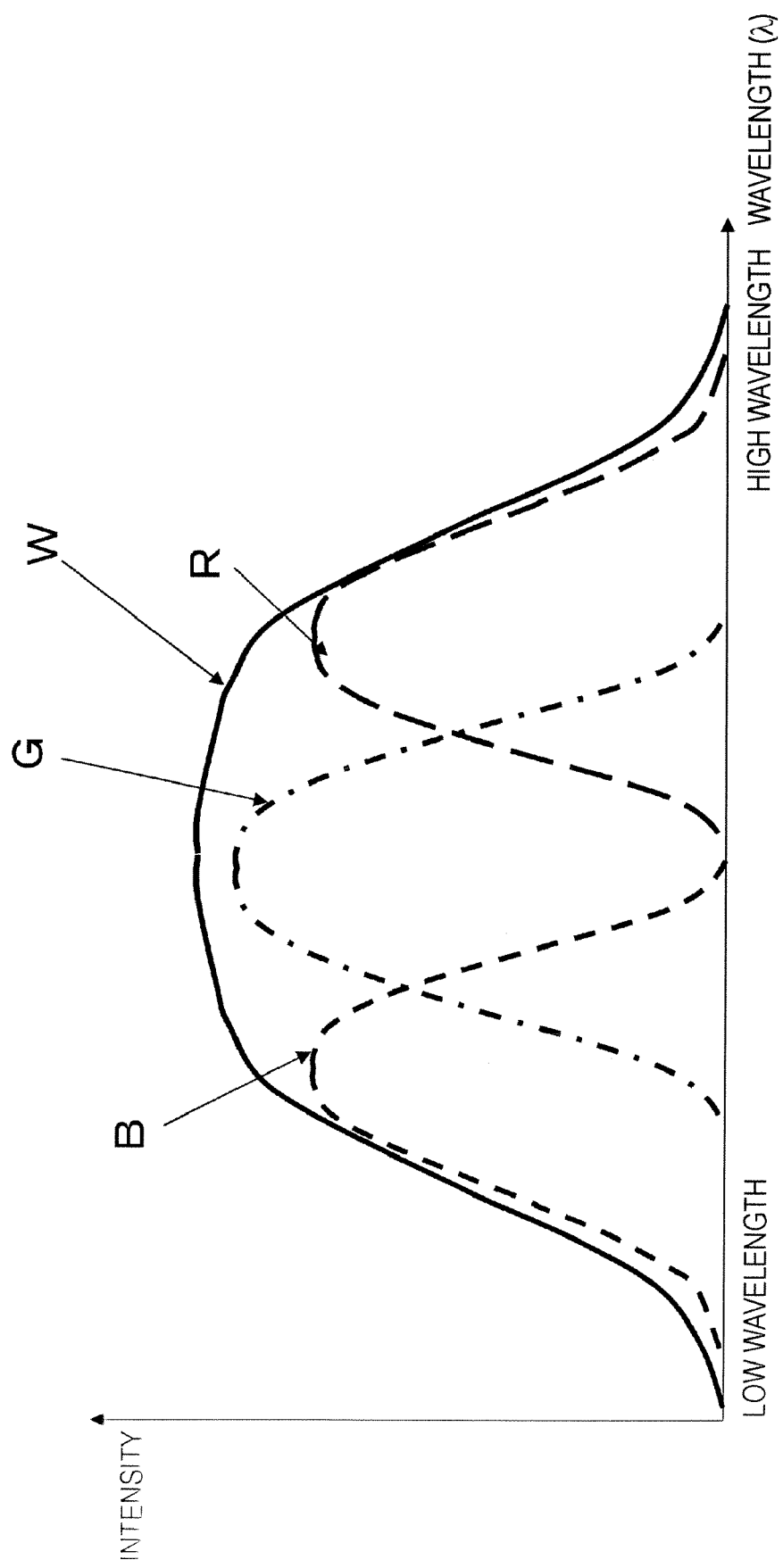
FIG. 5 is a diagram describing spectral characteristics of an image pickup device according to an embodiment of the present invention.

The above-described four types of spectral characteristics of filters will be described with reference to FIG. 5. In FIG. 5, a horizontal axis denotes a wavelength, and a vertical axis denotes an intensity of light received by each of R, G, B, and W light-receiving devices. The intensity of light received corresponds to the transmittance of a filter corresponding to each light-receiving device. Filters corresponding to B light-receiving devices have a high transmittance for light signals that have a wavelength in the vicinity of 450 nm corresponding to a blue color. In the light intensity distribution of light received by B light-receiving devices, the intensity of a light signal having a wavelength of approximately 450 nm is the highest. Filters corresponding to G light-receiving devices have a high transmittance for light signals that have a wavelength in the vicinity of 550 nm corresponding to a green color. In the light intensity distribution of light received by G light-receiving devices, the intensity of a light signal having a wavelength of approximately 550 nm is the highest. Filters corresponding to R light-receiving devices have a high transmittance for light signals that have a wavelength in the vicinity of 600 nm corresponding to a red color. In the light intensity distribution of light received by R light-receiving devices, the intensity of a light signal having a wavelength of approximately 600 nm is the highest. Filters corresponding to W light-receiving devices have characteristics such that all signals having R, G, and B components are allowed to pass therethrough, and W light-receiving devices receive visible light over all of R, G, and B wavelength ranges.

Thus, an image pickup device used in an image pickup apparatus according to an embodiment of the present invention is a single-plate image pickup device composed of R, G, and B devices that individually acquire visible light signals in specific light wavelength ranges such as R, G, and B wavelength ranges and W devices that acquire light signals including all visible light components such as R, G, and B components over a wide wavelength range.

Figure 6:
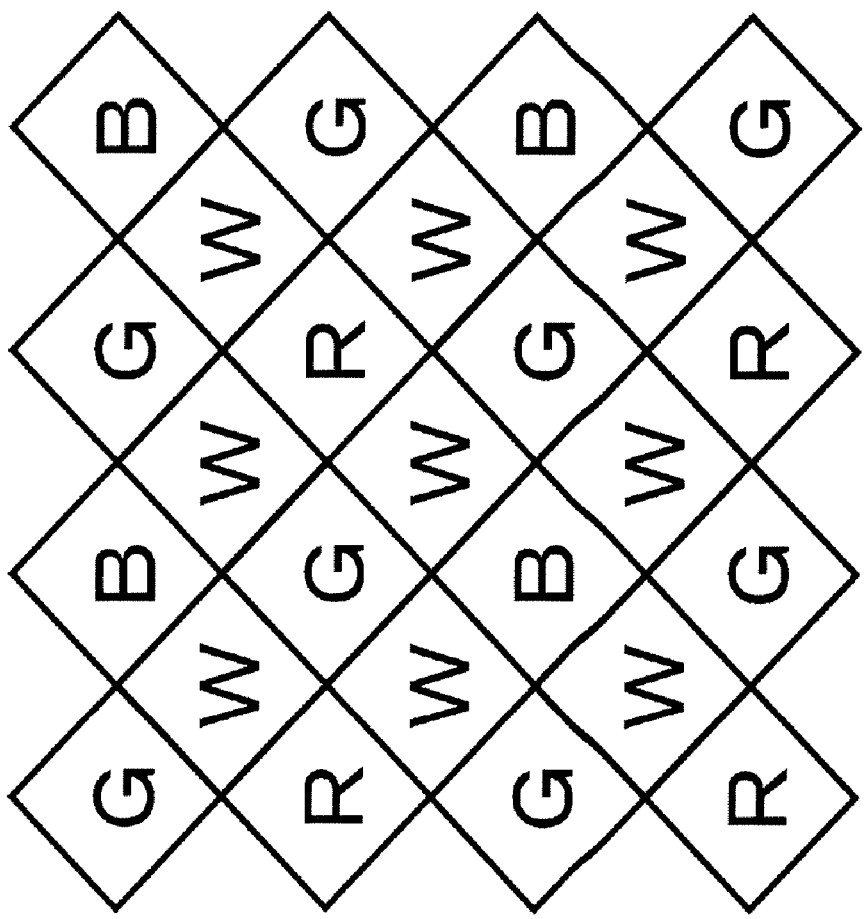
FIG. 6 is a diagram describing a color pattern used for an image pickup device according to an embodiment of the present invention.

That is, the image pick up device used in an image pickup apparatus according to an embodiment of the present invention is an image pickup device having four types of R, G, B, and W filters, and, as shown in FIG. 4, is composed of R, G, and B devices that individually obtain R, G, and B color signals and W devices that obtain all of the R, G, and B color signals. Here, these R, G, B, and W devices may be arranged in another pattern, for example, as shown in FIG. 6. The pattern of optical filters shown in FIG. 6 is obtained by rotating the pattern shown in FIG. 4 by 45 degrees.

In FIGS. 4 and 6, devices for receiving W signals are arranged in a checkered pattern. In an image pickup apparatus according to an embodiment of the present invention, signal processing is performed upon image data obtained by the image pickup device shown in FIGS. 4 or 6.

Figure 7:
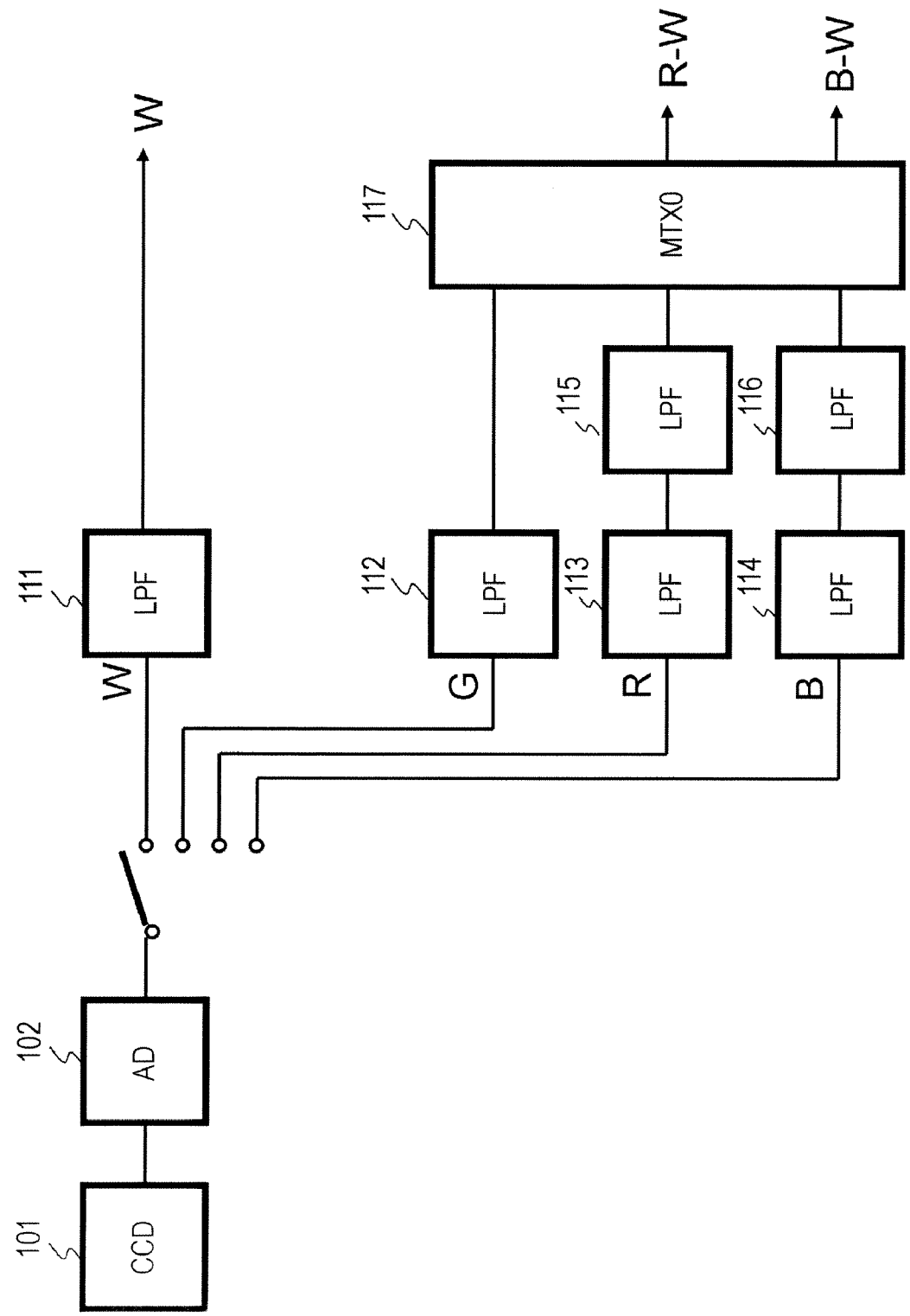
FIG. 7 is a diagram describing exemplary image signal processing.

Next, typical signal processing performed on image data obtained by the image pickup device shown in FIGS. 4 or 6 will be described with reference to FIG. 7. FIG. 7 is a diagram showing a mechanism used to obtain a luminance signal (W) and two color difference signals ((R−W) and (B−W)) by performing signal processing on an image captured by an image pickup device that has the pattern of R, G, B, and W light-receiving devices shown in FIGS. 4 or 6. Image data obtained by the image pickup device is subjected to image processing such as white balance control. Since this image processing is performed using a known method, the description thereof is not shown in FIG. 7.

In FIG. 7, a luminance signal generation unit and a color difference signal generation unit are shown. The luminance signal generation unit obtains a mosaiced image composed of signals received by W devices from among signals obtained by an image pickup device (CCD) 101 that has the pattern of R, G, B, and W devices shown in FIGS. 4 or 6, and generates a demosaiced image W as a luminance signal using signals obtained over a wide wavelength range. The color difference signal generation unit obtains R, G, and B mosaiced images composed of signals received by R, G, and B devices, generates R, G, and B demosaiced images using signals obtained in visible light ranges, and generates color difference signals on the basis of these generated R, G, and B demosaiced images. The luminance signal generation unit corresponds to a low-pass filter 111, and the color difference signal generation unit corresponds to low-pass filters 112 to 117 and a matrix computation unit 117.

Signal processing performed using the configuration shown in FIG. 7 will be described. First, a signal obtained by the image pickup device (CCD) 101 having the pattern of R, G, B, and W devices shown in FIGS. 4 or 6, is converted into digital data by an analog-to-digital conversion unit 102. The converted digital data corresponds to four mosaiced images, an R mosaiced image, a G mosaiced image, a B mosaiced image, and a W mosaiced image.

For example, if an image pickup device having the color pattern described with reference to FIG. 4 is used, four R, G, B, and W mosaiced images shown in FIG. 8A are obtained. These four mosaiced images are individually transmitted to the low-pass filters 111 to 116 so as to be subjected to demosaicing. These low-pass filters individually perform demosaicing on the received mosaiced images by interpolating blank pixel portions having no pixel value using values of adjacent pixels so as to set pixel values for all pixels.

Figure 2:
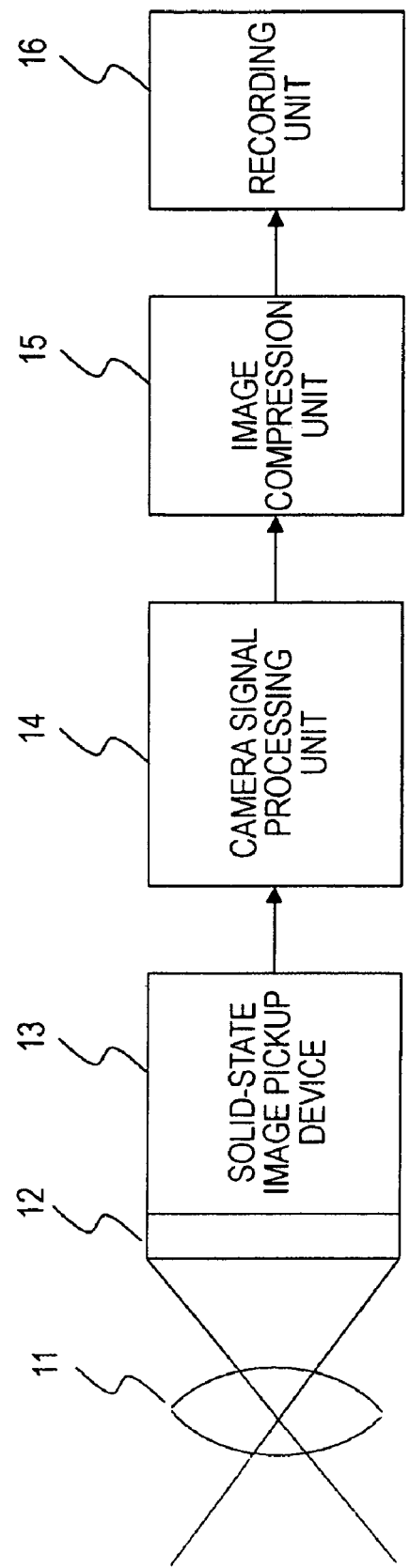
FIG. 2 is a diagram showing a configuration of an image pickup apparatus provided with a single-plate color solid-state image pickup device.
Figure 3:
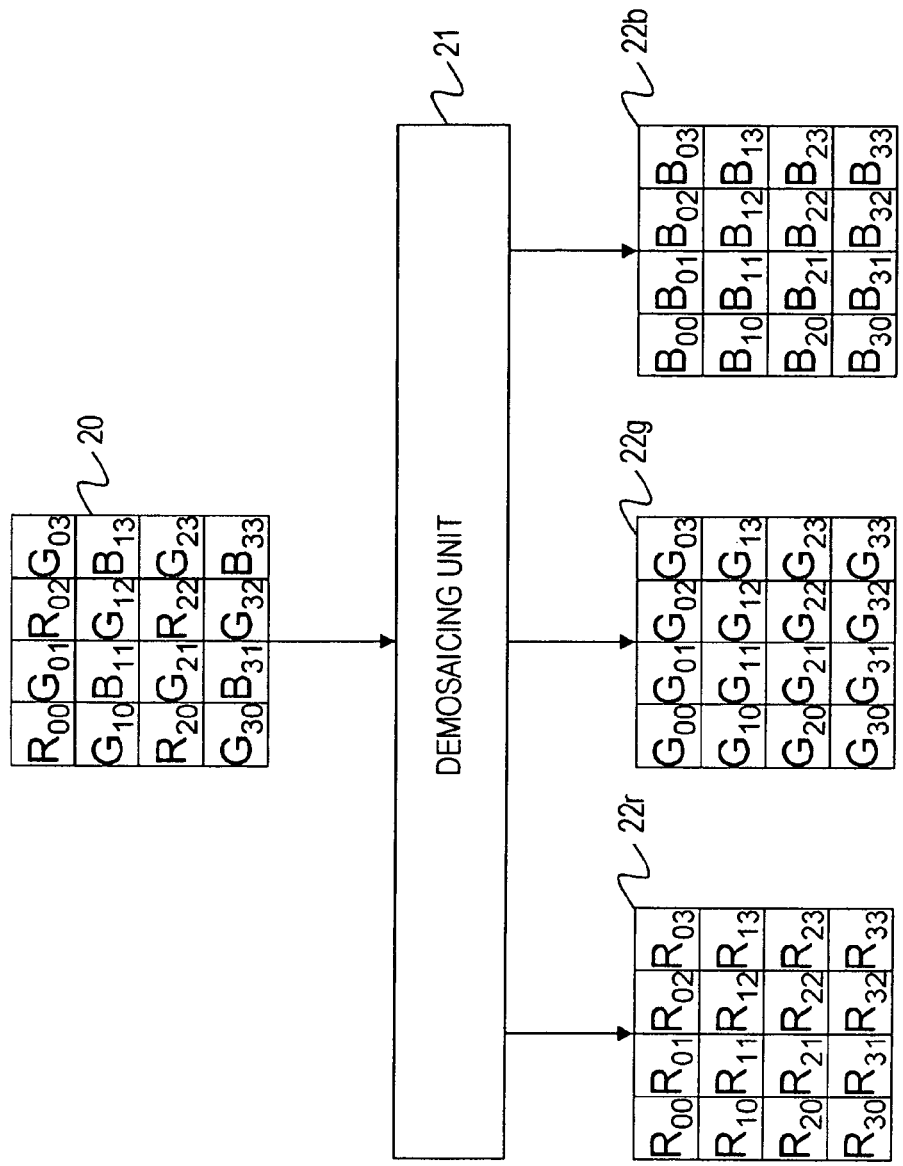
FIG. 3 is a diagram describing demosaicing.

As described previously with reference to FIG. 3, demosaicing is performed by interpolating blank pixel portions having no pixel value using values of adjacent pixels so as to set values for all pixels in accordance with, for example, the known Vargra algorithm. The Vargra algorithm defines a process of demosaicing in which gradients corresponding to eight different directions are calculated using pixel values and values of pixels having similar gradients are averaged.

The demosaicing is a processing performed to determine a pixel value of a blank pixel portion that has no pixel value using pixel values of adjacent pixels, and is performed by a two-dimensional FIR filter. That is, a filter having coefficients corresponding to pixel positions is employed. Here, in the case of the R and B mosaiced images, demosaicing is performed using two low-pass filters. First, the R and B mosaiced images are processed by the low-pass filters 113 and 114 functioning as interpolation filters for offset sub-sampling, and are then processed by the low-pass filters 115 and 116 that have the same function as that of the low-pass filter 112, respectively. Consequently, pixel values are set for all pixels.

As a result of the above-described interpolation processing, demosaiced images shown in FIG. 8B can be obtained. A demosaiced image 151 is a demosaiced image of an R channel generated as a result of interpolation processing performed in the low-pass filters 113 and 115 shown in FIG. 7. A demosaiced image 152 is a demosaiced image of a G channel generated as a result of interpolation processing performed in the low-pass filter 112 shown in FIG. 7. A demosaiced image 153 is a demosaiced image of a B channel generated as a result of interpolation processing performed in the low-pass filters 114 and 116 shown in FIG. 7. A demosaiced image 154 is a demosaiced image of a W channel generated as a result of interpolation processing performed in the low-pass filter 111 shown in FIG. 7.

In the four demosaiced images shown in FIG. 8B, R, G, B, and W denote pixel values included in the R, G, B, and W mosaiced images, respectively. On the other hand, r, g, b, and w denote interpolated pixel values obtained by demosaicing.

In the demosaiced image 154 shown in FIG. 8 which has been generated as a result of interpolation processing performed by the low-pass filter 111 shown in FIG. 7, pixel values of the W channel, that is, pixel values corresponding to intensity of light received over all of the R, G, and B visible light ranges are set for pixels included therein. This demosaiced image is output from the low-pass filter 111 as shown in FIG. 7.

On the other hand, the R, G, and B demosaiced images generated by the low-pass filters 112 to 116, that is, the demosaiced images 151 to 153 shown in FIG. 8B are input into the matrix computation unit 117 shown in FIG. 7. The matrix computation unit 117 generates color difference signals (R−W) and (B−W) by performing matrix computations using R, G, and B signals, and outputs the generated color difference signals.

However, if the same exposure period is set for all of the R, G, B, and W devices included in the above-described image pickup device, the W devices receive a larger amount of light compared with the R, G, and B devices, because the W devices can receive light over the entire visible light range. In the above-described pattern of R, G, B, and W devices, if the amount of light is controlled on the basis of one type of device, the other types of devices cannot receive an appropriate amount of light. Furthermore, as described previously, if the amount of light is controlled on the basis of the sensitivity of one type of device, the other types of devices cannot receive an appropriate amount of light. In an image pickup apparatus according to an embodiment of the present invention, even if an image pickup device having an array that includes light-receiving devices having different sensitivities is used, high-quality image data can be obtained by controlling imbalance among sensitivities of the light-receiving devices.

The assignee of the present invention proposed in Japanese Patent Application No. 2006-31932 an apparatus for controlling imbalance among different sensitivities of light-receiving devices arranged in an image pickup device by making the exposure period of light-receiving devices for high-sensitivity pixels different from that of light-receiving devices for low-sensitivity pixels. More specifically, a long exposure period is set for the light-receiving devices for low-sensitivity pixels and a short exposure period is set for the light-receiving devices for high-sensitivity pixels so that they can receive an appropriate amount of light. Image capturing is performed under such conditions. The captured images are mixed so as to generate a final image.

This apparatus is suitable for image capturing of stationary subjects. However, problems occur when the apparatus is used for image capturing of moving subjects. These problems will be described with reference to FIGS. 9A to 9C. FIG. 9A shows a change in the state of a subject with the passage of time. In the period from a time t1 to a time t5, a ball that is a part of the subject moves from left to right.

Here, light-receiving devices (W) for high-sensitivity pixels and light-receiving devices (R, G, and B) for low-sensitivity pixels are independently controlled. That is, the exposure period of the light-receiving devices (W) for high-sensitivity pixels is made different from that of the light-receiving devices (R, G, and B) for low-sensitivity pixels so that they can receive an appropriate amount of light. It is assumed that image capturing of the subject is performed under such conditions. In this case, the exposure period of the light-receiving devices (R, G, and B) for low-sensitivity pixels is set to a period T1 shown in FIG. 9A, and the exposure period of the light-receiving devices (W) for high-sensitivity pixels is set to a period T2 shown in FIG. 9A, the period T1 being longer than the period T2.

Consequently, an image captured by the light-receiving devices (R, G, and B) for low-sensitivity pixels in a period from the time t1 to the time t5 is as shown in FIG. 9B. On the other hand, an image captured by the light-receiving devices (W) for high-sensitivity pixels in a period from the time t4 to the time t5 is as shown in FIG. 9C. These images are mixed so as to generate a final image. However, the image shown in FIG. 9B, which has been captured by the light-receiving devices for low-sensitivity pixels, includes image portions of the subject obviously different from those included in the image shown in FIG. 9C, which has been captured by the light-receiving devices for high-sensitivity pixels.

That is, the image shown in FIG. 9B, which has been captured by the light-receiving devices for low-sensitivity pixels, includes image portions corresponding to movement of the ball in the period from the time t1 to the time t3. However, the image shown in FIG. 9C, which has been captured by the light-receiving devices for high-sensitivity pixels, does not include the image portions corresponding to the movement of the ball in the period from the time t1 to the time t3 and instead includes a background image at the positions of the image portions. Accordingly, if a signal processing circuit having the configuration shown in FIG. 7 is used in this case, the color difference signals (R−W) and (B−W) are generated on the basis of only image information about the ball. The luminance signal (W) output therefrom corresponds to the background image. If these signals are mixed, an image different from a real image is generated.

2. Image Processing According to an Embodiment of the Present Invention

Image processing according to an embodiment of the present invention will be described. In the image processing, the above-described problems are solved. That is, even if image capturing of a moving subject is performed using the RGBW image pickup device that is provided with light-receiving devices having different sensitivities and is configured to control exposure periods of the light-receiving devices in accordance with their sensitivities at the time of image capturing, an accurate output image can be generated.

2.1 Outline

Figure 10:
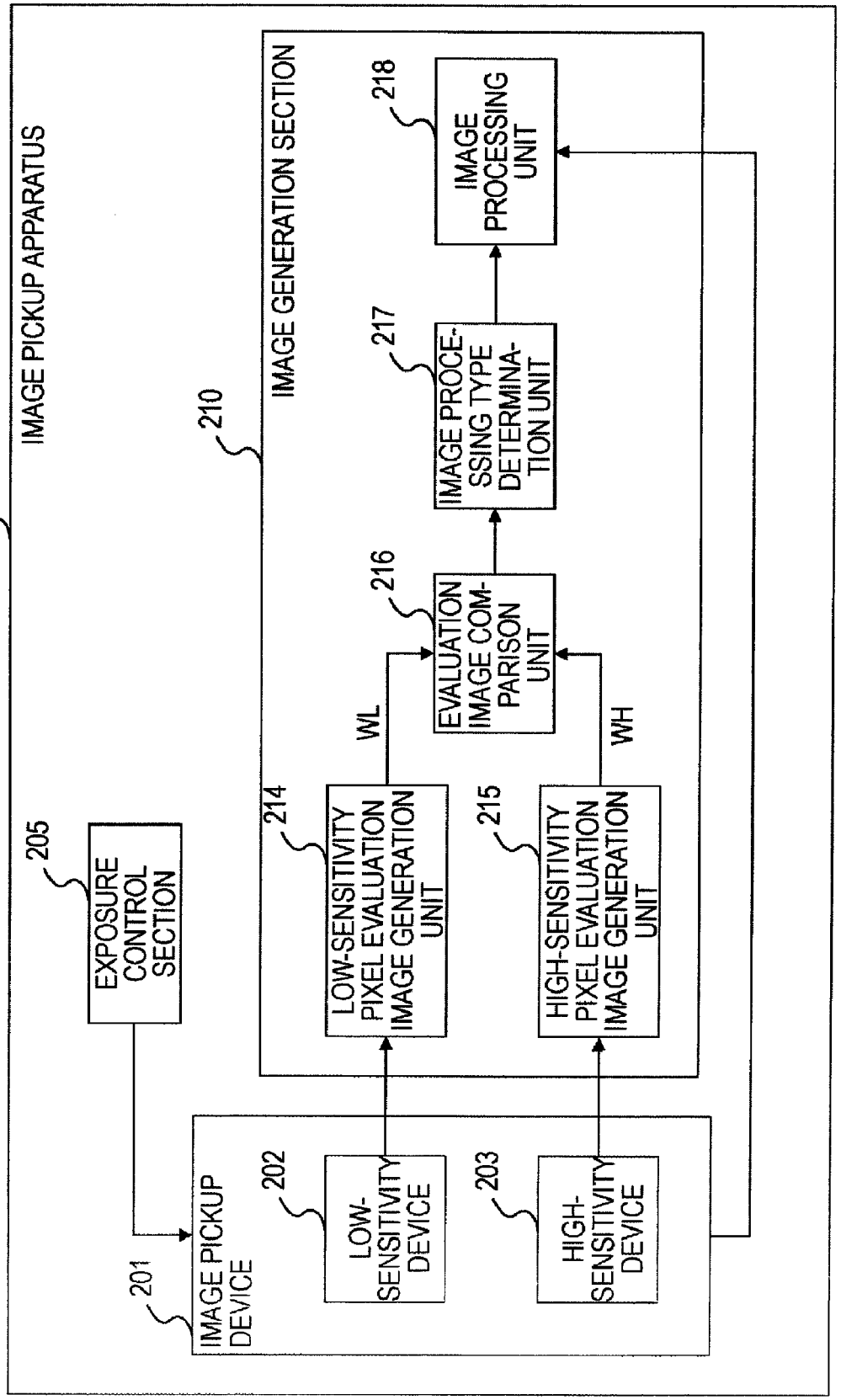
FIG. 10 is a diagram describing an exemplary configuration of an image pickup apparatus according to an embodiment of the present invention.

A configuration of an image pickup apparatus according to an embodiment of the present invention is shown in FIG. 10. An image pickup apparatus 200 is provided with an image pickup device 201 that includes light-receiving devices for low-sensitivity pixels 202 (hereinafter referred to as low-sensitivity devices 202) and light-receiving devices for high-sensitivity pixels 203 (herein after referred to as high-sensitivity devices 203), an exposure control section 205 for independently controlling exposure periods of the low-sensitivity devices 202 and the high-sensitivity devices 203 which are included in the image pickup device 201, and an image generation section 210. The image generation section 210 is provided with a low-sensitivity pixel evaluation image generation unit 214, a high-sensitivity pixel evaluation image generation unit 215, an evaluation image comparison unit 216, an image processing type determination unit 217, and an image processing unit 218.

The image pickup device 201 is composed of an array including a plurality of devices, some of which are devices for high-sensitivity pixels (hereinafter also referred to as high-sensitivity devices), and some of which are devices for low-sensitivity pixels (hereinafter also referred to as low-sensitivity devices). The high-sensitivity devices receive a relatively large amount of light and the low-sensitivity devices receive a relatively small amount of light. For example, as described previously with reference to FIGS. 4 and 6, the image pickup device 201 is composed of four types of light-receiving devices, a red (R) light-receiving device that allows light having a wavelength in the vicinity of a wavelength corresponding to a red color to be received, a green (G) light-receiving device that allows light having a wavelength in the vicinity of a wavelength corresponding to a green color to be received, a blue (B) light-receiving device that allows light having a wavelength in the vicinity of a wavelength corresponding to a blue color to be received, and a W light-receiving device that allows light having a wavelength corresponding to any of red, green, and blue colors to be received. The low-sensitivity devices 202 correspond to the R, G, and B light-receiving devices. The high-sensitivity devices 203 correspond to the W light-receiving devices. The high-sensitivity devices 203 may receive light over the entire visible light range, or may receive visible light and invisible light such as infrared light.

The exposure control section 205 independently controls exposure periods of the low-sensitivity devices 202 and the high-sensitivity devices 203 which are included in the image pickup device 201. That is, at the time of image capturing, the exposure control section 205 makes the exposure period of high-sensitivity devices (the W light-receiving devices) different from that of the low-sensitivity devices (the R, G, and B light-receiving devices) so that they can receive an appropriate amount of light. More specifically, as described previously with reference to FIG. 9A, the exposure period of the low-sensitivity devices (the R, G, and B light-receiving devices) is set to a long period such as the period T1 shown in FIG. 9A, and the exposure period of the high-sensitivity devices (the W light-receiving devices) is set to a short period such as the period T2 shown in FIG. 9A.

The image generation section 210 receives an output signal of the image pickup device 201, and performs image generation processing in accordance with the received signal under the control of a control unit. The low-sensitivity pixel evaluation image generation unit 214 obtains data of light received by the low-sensitivity devices 202, and generates a low-sensitivity pixel evaluation image WL as a first evaluation image using the obtained data. The low-sensitivity pixel evaluation image WL is an image that is generated using only R, G, and B signals obtained by the R, G, and B light-receiving devices without using W signals obtained by the W light-receiving devices. This image is generated as a result of interpolation processing performed using only the R, G, and B signals. The interpolation processing corresponds to demosaicing described previously with reference to FIGS. 8A and 8B.

On the other hand, the high-sensitivity pixel evaluation image generation unit 215 obtains data of light received by the high-sensitivity devices 203, and generates a high-sensitivity pixel evaluation image WH as a second evaluation image using the obtained data. The high-sensitivity pixel evaluation image WH is an image that is generated using only the W signals obtained by the W light-receiving devices. This image is generated as a result of interpolation processing performed using only the W signals. The interpolation processing corresponds to demosaicing described previously with reference to FIGS. 8A and 8B.

The evaluation image comparison unit 216 compares the low-sensitivity pixel evaluation image WL, which has been generated by the low-sensitivity pixel evaluation image generation unit 214 using only the R, G, and B signals, with the high-sensitivity pixel evaluation image WH, which has been generated by the high-sensitivity pixel evaluation image generation unit 215 using only the W signals. More specifically, the evaluation image comparison unit 216 compares a pixel value of each pixel included in the low-sensitivity pixel evaluation image WL with a pixel value of a corresponding pixel included in the high-sensitivity pixel evaluation image WH. For example, the evaluation image comparison unit 216 calculates differences between pixel values of the compared pixels, and determines whether the calculated pixel value differences are larger than a predetermined threshold value so as to specify a pixel region composed of pixels having pixel value differences larger than the threshold value.

The pixel region composed of pixels having pixel value differences larger than the threshold value corresponds to the image portions corresponding to the movement of the subject described previously with reference to FIGS. 9A to 9C, the image portions being included in the image shown in FIG. 9B, but not being included in the image shown in FIG. 9C. Thus, the evaluation image comparison unit 216 specifies a pixel region composed of pixels having pixel value differences larger than a predetermined threshold value on the basis of two evaluation images, and outputs information about the specified pixel region to the image processing type determination unit 217.

The image processing type determination unit 217 determines a type of image processing to be performed on a pixel-by-pixel basis on the basis of the information about the specified pixel region which has been transmitted from the evaluation image comparison unit 216, and controls the image processing unit 218 so as to cause it to perform optimum image processing upon each pixel. More specifically, the image processing type determination unit 217 causes the image processing unit 218 to generate an image using only signals (the R, G, and B signals) obtained by the low-sensitivity devices (the R, G, and B light-receiving devices) without using signals (the W signals) obtained by the high-sensitivity devices (the W light-receiving devices) for the pixel region composed of pixels having pixel value differences larger than the predetermined threshold value. On the other hand, the image processing type determination unit 217 causes the image processing unit 218 to generate an image using both of the signals (the R, G, and B signals) obtained by the low-sensitivity devices (the R, G, and B light-receiving devices) and the signals (the W signals) obtained by the high-sensitivity devices (the W light-receiving devices) for a pixel region composed of pixels having pixel value differences equal to or smaller than the predetermined threshold value.

Here, the above-described image generation performed by the image processing unit 218 using both of the signals (the R, G, and B signals) obtained by the low-sensitivity devices (the R, G, and B light-receiving devices) and the signals (the W signals) obtained by the high-sensitivity devices (the W light-receiving devices) corresponds to the signal processing described previously with reference to FIG. 7. Accordingly, the luminance signal (W) and the color difference signals ((R−W) and (B−W)) are generated on the basis of the R, G, B, and W input signals. On the other hand, the above-described image generation performed by the image processing unit 218 using only the signals (the R, G, and B signals) obtained by the low-sensitivity devices (the R, G, and B light-receiving devices) without using the signals (the W signals) obtained by the high-sensitivity devices (the W light-receiving devices) is performed using the configuration shown in FIG. 7 as follows. Only the R, G, and B input signals are used, and the luminance signal (W) is generated by adding the R, G, and B signals. That is, the generated signal (R+G+B) is used as a pseudo luminance signal W'. Thus, the luminance signal (W'), color difference signals ((R−W') and (B−W')) are generated.

2.2 Details of Evaluation Image Generation Processing

In order to accurately perform the pixel value comparison using the low-sensitivity pixel evaluation image WL, which has been generated by the low-sensitivity pixel evaluation image generation unit 214 on the basis of only the R, G, and B signals, and the high-sensitivity pixel evaluation image WH, which has been generated by the high-sensitivity pixel evaluation image generation unit 215 on the basis of only the W signals, it is desirable that the generation of these images be controlled in accordance with the characteristics of the image pickup device.

Details of the generation of the evaluation images will be described with reference to FIGS. 11A and 11B. As described previously, the comparison between the low-sensitivity pixel evaluation image WL, which has been generated by the low-sensitivity pixel evaluation image generation unit 214 on the basis of only the R, G, and B signals, and the high-sensitivity pixel evaluation image WH, which has been generated by the high-sensitivity pixel evaluation image generation unit 215 on the basis of only the W signals, is performed by comparing a pixel value of each pixel included in the low-sensitivity pixel evaluation image WL with a pixel value of a corresponding pixel included in the low-sensitivity pixel evaluation image WL. In this case, the pixel value of each pixel included in the high-sensitivity pixel evaluation image WH is determined in accordance with the amount of incident light received over the entire visible light range.

Figure 11A:
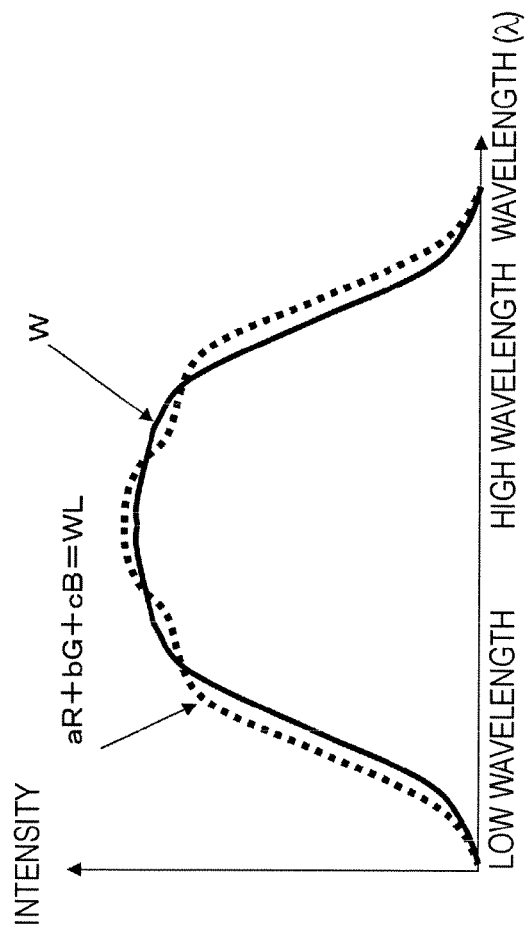
FIGS. 11A and 11B are diagrams describing evaluation image generation processing.
Figure 11B:
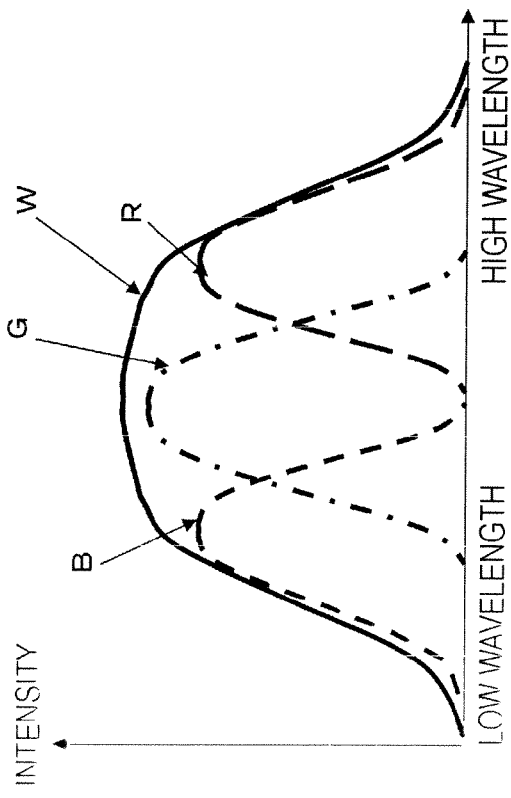

FIG. 11A shows spectral characteristics of filters disposed on the image pickup device which are the same as those described previously with reference to FIG. 5. The spectral characteristics of the filters for the R, G, B, and W light-receiving devices are shown. The filter for the W light-receiving device allows light over the entire visible light range including the R, G, and B wavelength ranges to pass therethrough. The filters for the R, G, and B light-receiving devices allow light having wavelengths corresponding to red, green, and blue colors, respectively, to pass therethrough.

In order to accurately compare the evaluation image generated using only the W signals obtained by the W light-receiving devices via the above-described filter with the evaluation image generated using only the R, G, B signals obtained by the R, G, and B light-receiving devices via the above-described filters, control processing of the evaluation images is performed. That is, a characteristic curve represented by aR+bG+cB=WL in FIG. 11B is obtained. On the basis of this characteristic curve, the evaluation image based on only the R, G, and B signals is calculated. In the characteristic curve, coefficients a, b, and c correspond to parameters, and are determined in accordance with spectral characteristics of the image pickup device. More specifically, the parameters a, b, and c are calculated so that the difference between a line WL, which is obtained by calculating the above-described equation aR+bG+cB=WL, and a line W can be the minimum value. The calculation of the parameters is performed using, for example, the least squares method.

A detailed example of the computation of the coefficients a, b, and c functioning as parameters will be described. The parameters a, b, and c can be calculated as follows. First, an intensity $WL(\lambda)$ of light having each wavelength in the low-sensitivity pixel evaluation image is calculated on the basis of spectral characteristics of the R, G, and B light-receiving devices using the following equation.

$$WL(\lambda) = (a, b, c) \cdot \begin{pmatrix} R(\lambda) \\ G(\lambda) \\ B(\lambda) \end{pmatrix}$$

In the above-described equation, $\lambda$ denotes a wavelength, and $R(\lambda)$, $G(\lambda)$, and $B(\lambda)$ denote intensities of light received by the R, G, and B light-receiving devices at the corresponding wavelength ($\lambda$), respectively. Here, the coefficients a, b, and c are calculated so that a difference value ($W(\lambda)-WL(\lambda)$) can be the minimum value.

The optimum values of the coefficients a, b, and c functioning as parameters vary according to an image capturing environment. Accordingly, it is desirable to use different parameters for different image capturing environments. If a light source such as sunlight, fluorescent light, or incandescent light under which image capturing will be performed varies, wavelength components included in light also vary. Accordingly, it is desirable to calculate or select an optimum parameter in accordance with a light source used.

Figure 12:
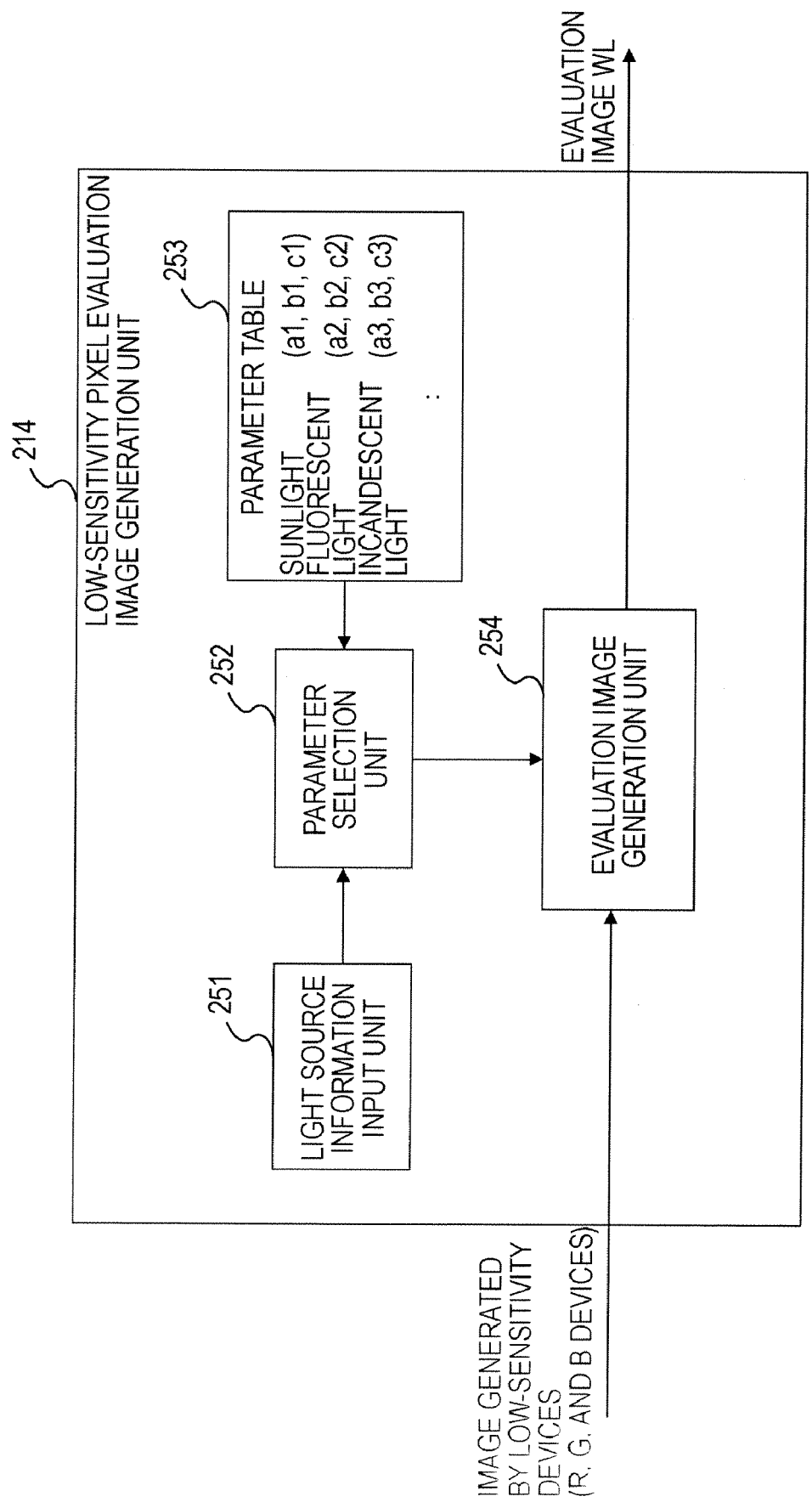
FIG. 12 is a diagram describing an exemplary configuration of a low-sensitivity pixel evaluation image generation unit included in an image pickup apparatus according to an embodiment of the present invention.

A configuration of the low-sensitivity pixel evaluation image generation unit 214 that selects optimum parameters (a, b, and c) in accordance with a light source used and then generates the low-sensitivity pixel evaluation image WL is shown in FIG. 12. FIG. 12 is a block diagram showing an exemplary detailed configuration of the low-sensitivity pixel evaluation image generation unit 214 included in the image pickup device shown in FIG. 10. The low-sensitivity pixel evaluation image generation unit 214 is provided with a light source information input unit 251, a parameter selection unit 252, a parameter table 253, and an evaluation image generation unit 254.

The light source information input unit 251 receives information about a light source in an image capturing environment. More specifically, a user inputs information about a light source such as sunlight, fluorescent light, or incandescent light into the light source information input unit 251 functioning as an input unit. Alternatively, a sensor may analyze a light source and the information obtained by the analysis about a light source such as sunlight, fluorescent light, or incandescent light may be input into the light source information input unit 251.

The parameter selection unit 252 selects parameters (a, b, and c) to be used for generation of a low-sensitivity pixel evaluation image on the basis of the light source information transmitted from the light source information input unit 251. The parameter table 253 stored in a storage unit includes parameters corresponding to light sources such as sunlight, fluorescent light, and incandescent light. The parameter selection unit 252 selects parameters corresponding to the light source information, which has been transmitted from the light source information input unit 251, from the parameter table 253, and outputs the selected parameters to the evaluation image generation unit 254.

The evaluation image generation unit 254 receives the images generated by the low sensitivity devices (the R, G, and B light-receiving devices), and generates the low-sensitivity pixel evaluation image WL by calculating equation WL=aR+bG+cB using the parameters transmitted from the parameter selection unit 252. The generated low-sensitivity pixel evaluation image WL is input into the evaluation image comparison unit 216 included in the image pickup apparatus shown in FIG. 10. Subsequently, in the evaluation image comparison unit 216, the low-sensitivity pixel evaluation image WL is compared with the high-sensitivity pixel evaluation image WH transmitted from the high-sensitivity pixel evaluation image generation unit 215, which has been generated using data of light received by the W light-receiving devices.

2.3 Details of Evaluation Image Comparison Processing

Next, evaluation image comparison processing performed by the evaluation image comparison unit 216 included in the image pickup apparatus shown in FIG. 10 will be described in detail. As described previously, the evaluation image comparison unit 216 compares the low-sensitivity pixel evaluation image WL, which has been generated by the low-sensitivity pixel evaluation image generation unit 214 using only the R, G, and B signals, with the high-sensitivity pixel evaluation image WH, which has been generated by the high-sensitivity pixel evaluation image generation unit 215 using only the W signals.

The evaluation image comparison unit 216 compares a pixel value of each pixel included in the high-sensitivity pixel evaluation image WH with a pixel value of a corresponding pixel included in the low-sensitivity pixel evaluation image WL so as to specify a pixel region composed of pixels having pixel value differences larger than a predetermined threshold value. The evaluation image comparison unit 216 compares these two images, the low-sensitivity pixel evaluation image WL and the high-sensitivity pixel evaluation image WH, and determines whether image processing should be performed using both of these two images or only one of them (the image generated by the low-sensitivity devices (the R, G, and B light-receiving devices)) on the basis of the comparison result.

The comparison of pixel values is performed by performing comparison computation of pixel values of corresponding pixels included in the evaluation images. The comparison computation is performed by calculating differences between pixel values of corresponding pixels included in the two images or by calculating ratios between them. In the following, comparison computation performed by computing differences will be described.

The evaluation image comparison unit 216 calculates a difference E between a pixel value of each pixel included in one of the evaluation images and a pixel value of a corresponding pixel included in the other evaluation image using the following equation.

$$E = X_{WL} - X_{WH}$$

where $X_{WL}$ denotes a pixel value of a pixel included in the low-sensitivity pixel evaluation image WL and $X_{WH}$ denotes a pixel value of a pixel included in the high-sensitivity pixel evaluation image WH.

The evaluation image comparison unit 216 compares an absolute value |E| of the difference E calculated using the above-described equation with a predetermined threshold value TH.

$$|E| > TH$$

If the above-described equation is satisfied, that is, if a pixel region is composed of pixels having absolute differences larger than the threshold value TH, the pixel region corresponds to the image portions corresponding to the movement of the subject described previously with reference to FIGS. 9A to 9C, the image portions being included in the image shown in FIG. 9B, but not being included in the image shown in FIG. 9C.

Thus, the evaluation image comparison unit 216 specifies a pixel region composed of pixels having pixel value differences larger than the predetermined threshold value using the two evaluation images, and outputs information about the specified pixel region to the image processing type determination unit 217. The image processing type determination unit 217 determines a type of image processing to be performed on a pixel-by-pixel basis on the basis of the information about the specified pixel region which has been transmitted from the evaluation image comparison unit 216, and controls the image processing unit 218 so as to cause it to perform optimum image processing upon each pixel. More specifically, the image processing type determination unit 217 causes the image processing unit 218 to generate an image using only signals (the R, G, and B signals) obtained by the low-sensitivity devices (the R, G, and B light-receiving devices) without using signals (the W signals) obtained by the high-sensitivity devices (the W light-receiving devices) for the pixel region composed of pixels having pixel value differences larger than the predetermined threshold value. On the other hand, the image processing type determination unit 217 causes the image processing unit 218 to generate an image using both of the signals (the R, G, and B signals) obtained by the low-sensitivity devices (the R, G, and B light-receiving devices) and the signals (the W signals)

obtained by the high-sensitivity devices (the W light-receiving devices) for a pixel region composed of pixels having pixel value differences equal to or smaller than the predetermined threshold value.

Here, for example, if a pixel value of each pixel is an 8-bit value (a 256-step gradation), a detailed example of the threshold value TH used by the evaluation image comparison unit 216 is a 10-step gradation. That is, it is determined whether a difference between a pixel value ($X_{WL}$) of each pixel included in the low-sensitivity pixel evaluation image WL and a pixel value ($X_{WH}$) of a corresponding pixel included in the high-sensitivity pixel evaluation image WH is larger than the 10-step gradation. If the difference is larger than the 10-step gradation, it is determined that a pixel region composed of pixels having pixel value differences larger than the 10-step gradation corresponds to a region that has different image portions in the evaluation images, that is, the image portions (a corrupted region) corresponding to the movement of the subject described previously with reference to FIGS. 9A to 9C, the image portions being included in the image shown in FIG. 9B, but not being included in the image shown in FIG. 9C.

However, in reality, it is difficult to ensure that the low-sensitivity pixel evaluation image WL and the high-sensitivity pixel evaluation image WH have the same spectral characteristics. Accordingly, the determination value is required to be controlled in accordance with a degree of agreement between these spectral characteristics. The image processing type determination unit 217 determines a type of image processing to be performed on a pixel-by-pixel basis on the basis of the determination information transmitted from the evaluation image comparison unit 216, and controls the image processing unit 218 so as to cause it to perform optimum image processing on each pixel. That is, the image processing type determination unit 217 determines on a pixel-by-pixel basis whether image generation should be performed on each pixel using both of information obtained by high-sensitivity pixels and information obtained by low-sensitivity pixels or using only one of them. In this embodiment, low-sensitivity pixels have color information. Accordingly, for a pixel region composed of pixels having the differences E larger than the threshold value, image generation is performed using low-sensitivity pixels.

The image portions (a corrupted region) corresponding to the movement of the subject described previously with reference to FIGS. 9A to 9C, the portions being included in the image shown in FIG. 9B, but not being included in the image shown in FIG. 9C, is a pixel region composed of pixels having pixel value differences larger than the predetermined threshold value. Accordingly, for the corrupted region, the image processing unit 218 generates an image using only the signals (the R, G, and B signals) obtained by the low-sensitivity devices (the R, G, and B light-receiving devices) without using the signals (the W signals) obtained by the high-sensitivity devices (the W light-receiving devices). On the other hand, another image region, that is, an image portion that includes the same image of a subject in both images, is a pixel region composed of pixels having pixel value differences equal to or smaller than the predetermined threshold value. Accordingly, for this pixel region, the image processing unit 218 generates an image using both of the signals (the W signals) obtained by the high-sensitivity devices (the W light-receiving devices) and the signals (the R, G, and B signals) obtained by the low-sensitivity devices (the R, G, and B light-receiving devices). Sampling frequencies of filters for the R, G, and B light-receiving devices are lower than a sampling frequency of filters for the W light-receiving devices. Accordingly, if an image is generated using only the signals (the R, G, and B signals) obtained by low-sensitivity devices (the R, G, and B light-receiving devices), the resolution of the generated image becomes lower than that of the other image. However, since the generated image corresponds to the image portions corresponding to the movement of the subject, the reduction of the resolution is not marked.

The image processing unit 218 performs image generation processing upon each pixel region on the basis of pixel value differences, and mixes a plurality of pieces of data generated on a pixel-by-pixel basis so as to generate a single output image.

As described previously, the image generation performed by the image processing unit 218 using both of the signals (the R, G, and B signals) obtained by the low-sensitivity devices (the R, G, and B light-receiving devices) and the signals (the W signals) obtained by the high-sensitivity devices (the W light-receiving devices) corresponds to the signal processing described previously with reference to FIG. 7. Accordingly, the luminance signal (W) and the color difference signals ((R−W) and (B−W)) are generated on the basis of the R, G, B, and W input signals. On the other hand, the image generation performed by the image processing unit 218 using only the signals (the R, G, and B signals) obtained by the low-sensitivity devices (the R, G, and B light-receiving devices) without using the signals (the W signals) obtained by the high-sensitivity devices (the W light-receiving devices) is performed using the configuration shown in FIG. 7 as follows. Only the R, G, and B input signals are used, and the luminance signal (W) is generated by adding the R, G, and B signals. That is, the generated signal (R+G+B) is used as a pseudo luminance signal W'. Thus, the luminance signal (W'), color difference signals ((R−W') and (B−W')) are generated.

As described previously, in an image pickup apparatus according to an embodiment of the present invention, image processing is performed as follows. An RGBW image pickup device, that is, an image pickup device including low-sensitivity devices (the R, G, and B light-receiving devices) and high-sensitivity devices (the W light-receiving devices) is used. A long exposure period is set for the low-sensitivity devices, and a short exposure period is set for the high-sensitivity devices. An evaluation image generated using only data obtained by the low-sensitivity devices (the R, G, and B light-receiving devices) is compared with an evaluation image generated using only data obtained by the high-sensitivity devices (the W light-receiving devices). For a pixel region having a large difference between them, image generation processing is performed using only one of the evaluation images. On the other hand, for a pixel region having a small difference between them, image generation processing is performed using both of the evaluation images. In FIGS. 9A to 9C, differences between exposure periods of light-receiving devices cause differences between images to be mixed in a region corresponding to the movement of the subject. Consequently, errors occur at the time of image mixing. However, in an image pickup apparatus according to an embodiment of the present invention, the occurrence of such errors can be prevented and a high-quality image can be obtained.

In the above-described embodiment, the high-sensitivity devices 203 are configured to receive light over the entire visible light range. However, as described previously, the high-sensitivity devices 203 may be configured to receive visible light and invisible light such as infrared light.

3. Other Embodiments

Other embodiments obtained by making modifications to the configuration of the above-described image pickup apparatus according to an embodiment of the present invention will be described.

3.1 Control of Evaluation Image

In the above-described image pickup apparatus, in order to accurately perform the pixel value comparison using the low-sensitivity pixel evaluation image WL, which has been generated by the low-sensitivity pixel evaluation image generation unit 214 on the basis of only the R, G, and B signals, and the high-sensitivity pixel evaluation image WH, which has been generated by the high-sensitivity pixel evaluation image generation unit 215 on the basis of only the W signals, it is desirable that the generation of these images be controlled in accordance with the characteristics of the image pickup device. In the above-described embodiment, exemplary image generation processing has been described in which the coefficients a, b, and c functioning as parameters are determined and the low-sensitivity pixel evaluation image WL is generated by calculating WL=aR+bG+cB using the determined parameters.

However, when the resolution of the high-sensitivity pixel evaluation image WH, which has been generated by the high-sensitivity pixel evaluation image generation unit 215 using only the W signals, is compared with that of the low-sensitivity pixel evaluation image WL, which has been generated by the low-sensitivity pixel evaluation image generation unit 214 using only the R, G, and B signals, the resolution of the high-sensitivity pixel evaluation image WH is higher than that of the low-sensitivity pixel evaluation image WL. Accordingly, a difference between the low-sensitivity pixel evaluation image WL and the high-sensitivity pixel evaluation image WH tends to be large in a high-frequency region of these images. That is, in an edge portion of a subject, a large difference between the two evaluation images tends to occur.

Figure 13:
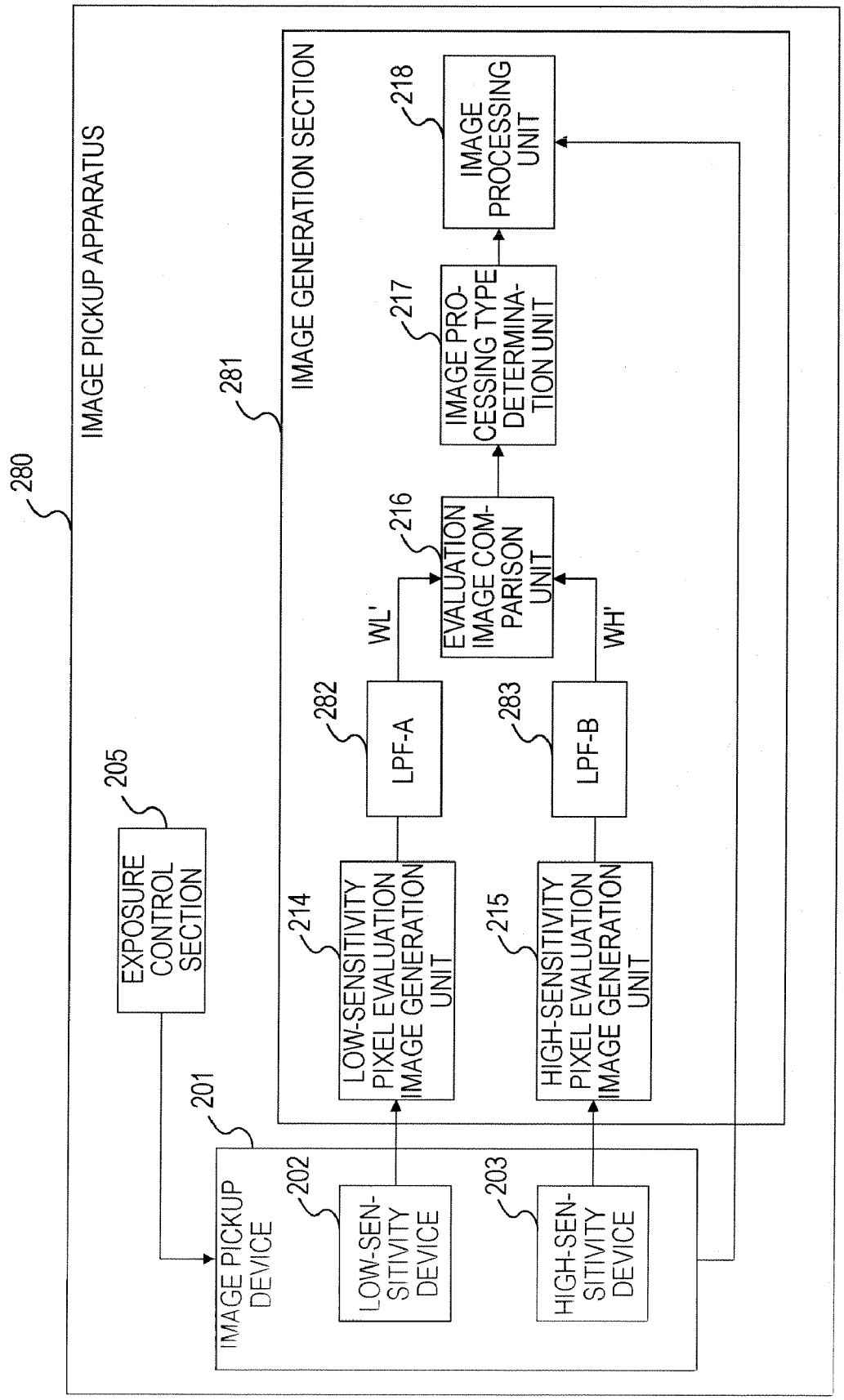
FIG. 13 is a diagram showing an exemplary configuration of an image pickup apparatus according to an embodiment of the present invention.

This problem can be solved by removing high-frequency components from the evaluation images and comparing the processed evaluation images. Such processing for removing high-frequency components will be described. FIG. 13 is a diagram showing an exemplary configuration of an image pickup apparatus according to this embodiment. Like the image pickup apparatus 200 shown in FIG. 10, an image pickup apparatus 280 shown in FIG. 13 is provided with the image pickup device 201 including the low-sensitivity devices 202 and the high-sensitivity devices 203, and the image generation section 281 including the low-sensitivity pixel evaluation image generation unit 214, the high-sensitivity pixel evaluation image generation unit 215, the evaluation image comparison unit 216, the image processing type determination unit 217, and the image processing unit 218. Furthermore, in this embodiment, the image pickup apparatus 280 is provided with a low-pass filter (LPF) 282 for removing high-frequency components from an evaluation image generated by the low-sensitivity pixel evaluation image generation unit 214 and a low-pass filter (LPF) 283 for removing high-frequency components from an evaluation image generated by the high-sensitivity pixel evaluation image generation unit 215.

The low-pass filter 282 removes high-frequency components from the low-sensitivity pixel evaluation image generated by the low-sensitivity pixel evaluation image generation unit 214 using only the R, G, and B signals, and outputs an acquired image as an evaluation image WL'. The low-pass filter 283 removes high-frequency components from the high-sensitivity pixel evaluation image generated by the high-sensitivity pixel evaluation image generation unit 215 using only the W signals, and outputs an acquired image as an evaluation image WH'. The evaluation image comparison unit 216 receives the evaluation images WL' and WH', and compares them. By performing the above-described processing, the occurrence of a large difference between two evaluation images can be prevented, and accurate image comparison can be performed. Here, each of the low-pass filters can be configured with, for example, a Gaussian filter. The sizes of the low-pass filters (the number of taps thereof) or the shapes thereof are optimized so that frequency bands of the evaluation images can be closer to each other.

3.2 Control of Unit of Image Processing

As described previously, the evaluation image comparison unit 216 compares a pixel value of each pixel included in the low-sensitivity pixel evaluation image WL, which has been generated by the low-sensitivity pixel evaluation image generation unit 214 using only the R, G, and B signals, with a pixel value of a corresponding pixel included in the high-sensitivity pixel evaluation image WH, which has been generated by the high-sensitivity pixel evaluation image generation unit 215 using only the W signals. The image processing type determination unit 217 determines a type of image processing to be performed on a pixel-by-pixel basis on the basis of the information about the specified region which has been transmitted from the evaluation image comparison unit 216, and controls the image processing unit 218 to cause it to perform optimum image processing upon each pixel. More specifically, the image processing type determination unit 217 causes the image processing unit 218 to generate an image using only signals (the R, G, and B signals) obtained by the low-sensitivity devices (the R, G, and B light-receiving devices) without using signals (the W signals) obtained by the high-sensitivity devices (the W light-receiving devices) for the pixel region composed of pixels having pixel value differences larger than the predetermined threshold value. On the other hand, the image processing type determination unit 217 causes the image processing unit 218 to generate an image using both of the signals (the R, G, and B signals) obtained by the low-sensitivity devices (the R, G, and B light-receiving devices) and the signals (the W signals) obtained by the high-sensitivity devices (the W light-receiving devices) for a pixel region composed of pixels having pixel value differences equal to or smaller than the predetermined threshold value.

However, as described previously, if image processing is performed after image evaluation has been performed on a pixel-by-pixel basis and a type of image processing to be performed has been determined on a pixel-by-pixel basis, it is sometimes accidentally determined that there are no differences between two evaluation images according to the state of a subject even though they have different image portions of the subject. In this case, a pixel region upon which appropriate image processing will not be performed may occur. In order to prevent such an error, a method of setting a region including a plurality of pixels as a unit of image processing is effective. Thus, the image processing type determination unit 217 determines a type of image processing to be performed on a region including a plurality of pixels, and causes the image processing unit 218 to perform the determined type of image processing.

Figure 14:
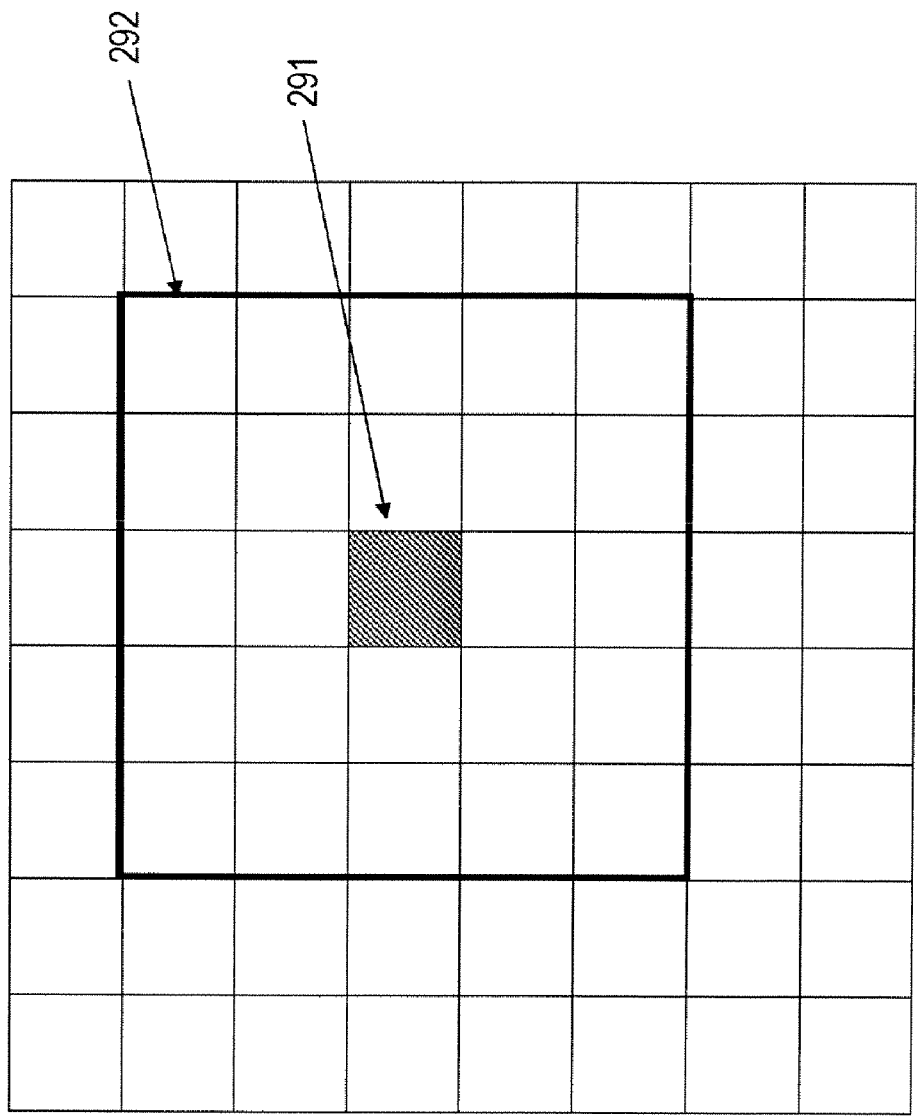
FIG. 14 is a diagram describing image processing type determination processing performed by an image pickup apparatus according to an embodiment of the present invention.

Exemplary image processing type determination performed by the image processing type determination unit 217 will be described with reference to FIG. 14. For example, as shown in FIG. 14, if a single corrupted pixel 291, that is, the corrupted pixel 291 having a pixel value difference larger than a threshold value, the pixel value difference being a difference between pixel values of corresponding pixels in the low-sensitivity pixel evaluation image WL and the high-sensitivity pixel evaluation image WH, is detected, the image processing type determination unit 217 sets a region 292 including the corrupted pixel 291 at the center thereof and a plurality of pixels around the corrupted pixel as a region upon which a single type of image processing will be performed. That is, the region 292 is set as a region for which the image processing unit 218 will generate an image using only the signals (the R, G, and B signals) obtained by the low-sensitivity devices (the R, G, and B light-receiving devices) without using the signals (the W signals) obtained by high-sensitivity devices (the W light-receiving devices). In an example shown in FIG. 14, the pixel region 292 having 5×5 pixels in which the corrupted pixel 291 is centrally located is set as a single unit of image processing. By performing the above-described processing, the omission of detection of a corrupted region can be prevented.

3.3 Control of Range of Evaluation Image Comparison Processing

As described previously, the evaluation image comparison unit 216 compares the low-sensitivity pixel evaluation image WL, which has been generated by the low-sensitivity pixel evaluation image generation unit 214 using only the R, G, and B signals, with the high-sensitivity pixel evaluation image WH, which has been generated by the high-sensitivity pixel evaluation image generation unit 215 using only the W signals, by comparing a pixel value of each pixel included in the low-sensitivity pixel evaluation image WL with a pixel value of a corresponding pixel included in the high-sensitivity pixel evaluation image WH.

In the above-described exemplary processing, demosaicing described previously with reference to FIGS. 8A and 8B, that is, interpolation processing is performed using data output from the low-sensitivity devices so as to generate interpolation images. The low-sensitivity pixel evaluation image WL is generated on the basis of the generated interpolation images. Similarly, the high-sensitivity pixel evaluation image WH is generated on the basis of an interpolation image. Subsequently, these evaluation images are compared. In the following, comparison processing between images that have yet to be subjected to such interpolation processing will be described.

Figure 15:
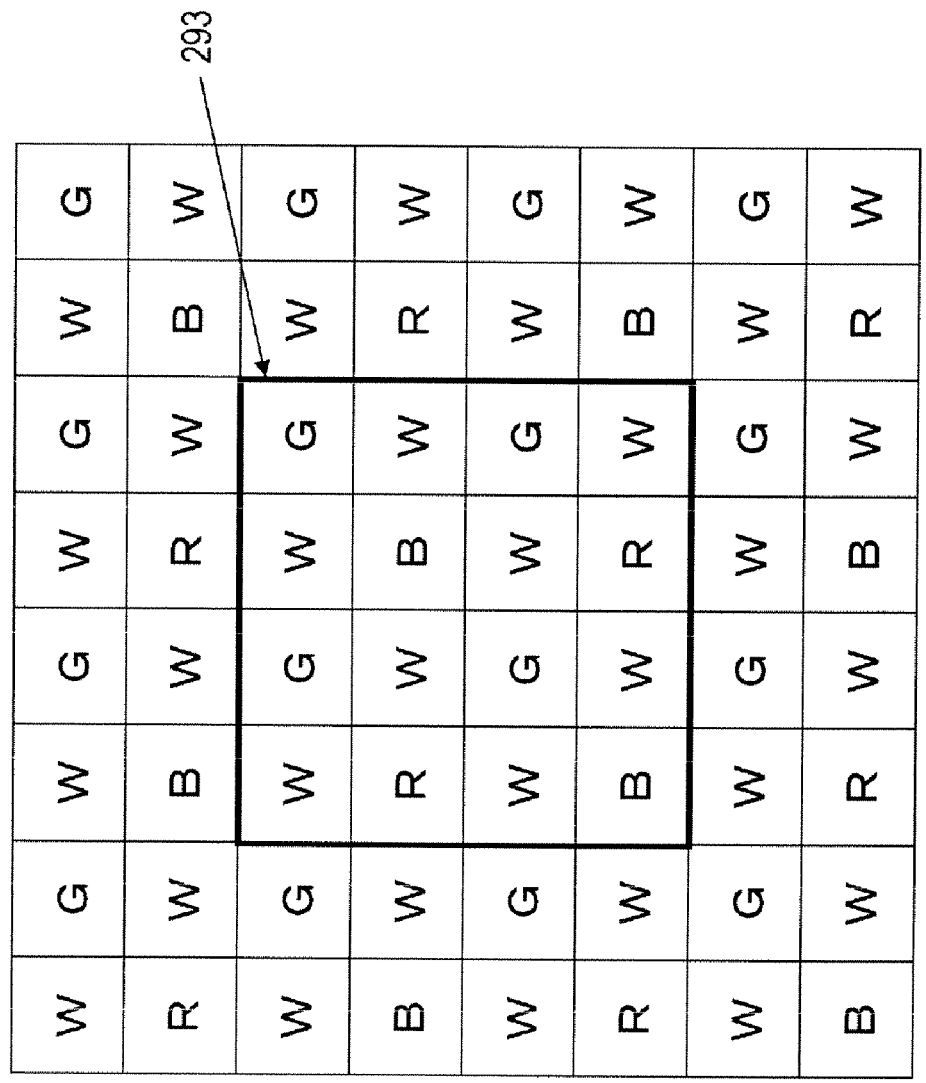
FIG. 15 is a diagram describing image comparison processing performed by an image pickup apparatus according to an embodiment of the present invention.

Image comparison processing performed by the evaluation image comparison unit 216 will be described with reference to FIG. 15. FIG. 15 is a diagram showing output data of an RGBW image pickup device which includes R, G, B, and W signals for which interpolation processing, that is, demosaicing has not yet been performed. The evaluation image comparison unit 216 receives this data that has yet to be subjected to interpolation processing from the image pickup device, sets a pixel region including all types of R, G, B, and W signals, for example, a pixel region of 4×4 pixels as shown in FIG. 15, as an evaluation unit region 293, and performs comparison processing.

The evaluation image comparison unit 216 selects the pixel region of 4×4 pixels, calculates averages of pixel values of individual types of R, G, and B pixels, and calculates an average WL of the pixel region of 4×4 pixels on the basis of the calculated averages. Furthermore, the evaluation image comparison unit 216 calculates an average W of the pixel region of 4×4 pixels. Subsequently, the evaluation image comparison unit 216 calculates a difference between the calculated averages WL and W, and compares the calculated difference with a predetermined threshold value (TH). This comparison processing is performed on the above-described pixel region basis. However, subsequently, the pixel region may be shifted by one pixel pitch or a pitch (a 4 by 4 matrix of pixels) of this pixel region, and then comparison processing may be performed. Thus, various types of comparison processing may be performed.

For a pixel region having a pixel value difference larger than the predetermined threshold value, the image processing unit 218 generates an image using only the signals (the R, G, and B signals) obtained by the low sensitivity devices (the R, G, and B light-receiving devices) without using the signals (the W signals) obtained by the high-sensitivity devices (the W light-receiving devices). On the other hand, for a pixel region having a pixel value difference equal to or smaller than the threshold value, the image processing unit 218 generates an image using both of the signals (the R, G, and B signals) obtained by the low sensitivity devices (the R, G, and B light-receiving devices) and the signals (the W signals) obtained by the high-sensitivity devices (the W light-receiving devices). In this image generation processing, image generation is not performed on a pixel-by-pixel basis, but is performed on a pixel region basis, the pixel region having a plurality of pixels, for example, 4×4 pixels.

3.4 Optimum Control Based on a Difference Between Pixel Values

In the above-described exemplary processing, a single threshold value (TH) is compared with a pixel value difference between two evaluation images. For a pixel region having a pixel value difference larger than the predetermined threshold value, an image is generated using only the signals (the R, G, and B signals) obtained by the low-sensitivity device (the R, G, and B light-receiving devices) without using the signals (the W signals) obtained by the high-sensitivity devices (the W light-receiving devices). On the other hand, for a pixel region having a pixel value difference equal to or smaller than the predetermined threshold value, an image is generated using both of the signals (the R, G, and B signals) obtained by the low-sensitivity device (the R, G, and B light-receiving devices) and the signals (the W signals) obtained by the high-sensitivity devices (the W light-receiving devices). Thus, two types of image processing are selected and performed.

In the following exemplary processing, such selection of two types of image processing is not performed. Image processing is performed in a plurality of steps equal to or larger than three steps in accordance with a pixel value difference between two evaluation images.

The evaluation image comparison unit 216 calculates a difference E between pixel values of corresponding pixels in the evaluation images using the following equation.

$$E = X_{WL} - X_{WH}$$

where $X_{WL}$ denotes a pixel value of a pixel included in the low-sensitivity pixel evaluation image WL and $X_{WH}$ denotes a pixel value of a pixel included in the high-sensitivity pixel evaluation image WH. This processing is the same as that described previously.

The evaluation image comparison unit 216 compares an absolute value |E| of the difference E calculated using the above-described equation with a plurality of predetermined threshold values TH1 to THn, and determines a type of image processing to be performed on the basis of the absolute value |E| of the difference E as shown in the following.

$0 \leq |E| < TH1$: low-sensitivity device:high-sensitivity device=0:10

$TH1 \leq |E| < TH2$:low-sensitivity device:high-sensitivity device=3:7

$TH2 \leq |E| < TH3$:low-sensitivity device:high-sensitivity device=5:5

$TH3 \leq |E| < TH4$:low-sensitivity device:high-sensitivity device=7:3

$TH4 \leq |E|$:low-sensitivity device:high-sensitivity device=10:0

That is, for a pixel region having the absolute value |E| of the difference E between two evaluation images which is equal to or larger than zero and smaller than a threshold value TH1, an image is generated using only data obtained by the high-sensitivity devices. For a pixel region having the absolute value |E| equal to or larger than the threshold value TH1 and smaller than a threshold value TH2, an image is generated using data obtained by the low-sensitivity devices and data obtained by the high-sensitivity devices at a ratio of 3:7. For a pixel region having the absolute value |E| equal to or larger than the threshold value TH2 and smaller than a threshold value TH3, an image is generated using data obtained by the low-sensitivity devices and data obtained by the high-sensitivity devices at a ratio of 5:5. For a pixel region having the absolute value |E| equal to or larger than the threshold value TH3 and smaller than a threshold value TH4, an image is generated using data obtained by the low-sensitivity devices and data obtained by the high-sensitivity devices at a ratio of 7:3. For a pixel region having the absolute value |E| equal to or larger than the threshold value TH4, an image is generated using only data obtained by the low-sensitivity devices.

Here, for example, if a pixel value of each pixel is an 8-bit value (a 256-step gradation), detailed examples of the threshold values TH1, TH2, TH3, and TH4 used by the evaluation image comparison unit 216 are a 10-step gradation, a 20-step gradation, a 30-step gradation, and a 40-step gradation, respectively.

For example, description will be made using one of the above-described equations, $TH1 \leq |E| < TH2$:low-sensitivity device:high-sensitivity device=3:7.

For the pixel region having the absolute value |E| satisfying this equation, in the configuration described previously with reference to FIG. 7, the signal (the W signal) which the high-sensitivity devices (the W light-receiving devices) have obtained and the signal (the W' signal) which the low-sensitivity devices (the R, G, and B light-receiving devices) have generated as a pseudo luminance signal by adding the R, G, and B signals are used at a ratio of 7:3.

Thus, in this case, selection between two pieces of pixel information is not performed. The ratio (weight) of the two pieces of pixel information to be used for image generation is determined. Consequently, an image with a natural boundary between an image portion corresponding to the movement of a subject and a still image portion can be obtained.

The present invention has been described in detail with reference to specific embodiments. However, it is obvious that modifications and substitutions of the embodiments can be made by those skilled in the art without departing from the scope of the present invention. That is, the present invention has been disclosed in conjunction with the embodiments, and the details of this specification should not be restrictively interpreted. The scope of the present invention should be interpreted in consideration of the scope of the appended claims.

The above-described processing flow can be performed by hardware, software, or the combination thereof. If the processing flow is performed by software, a program recording a processing sequence is installed in a memory included in a computer embedded in a piece of dedicated hardware or, for example, on a general-purpose computer that is allowed to perform various processing operations by installing various programs thereon.

For example, the program may be recorded on a recording medium such as a hard disk or a ROM (Read-Only Memory) in advance. Alternatively, the program may be temporarily or permanently stored (recorded) on a removal recording medium such as a flexible disk, a CD-ROM (Compact Disc-Read-Only Memory), an MO (Magneto-Optical) disk, a DVD (Digital Versatile Disc), a magnetic disk, or a semiconductor memory. Such a removable recording medium may be obtained as package software.

When the program is installed from the above-described removable recording medium on a computer, the program may be wirelessly transferred from a download site to the computer, or may be transferred to the computer via a wired network such as the Internet. The computer may receive the transferred program, and install the received program on an internal recording medium such as a hard disk.

Various types of processing operations described in this specification may be executed in chronological order described above. Alternatively, the processing operations may be executed concurrently or individually as appropriate or in accordance with the processing power of an apparatus for executing these processing operations. In this specification, a system means a logical group of a plurality of apparatuses. These apparatuses may not be in a single cabinet.

What is claimed is:

1. An image pickup apparatus comprising:
an image pickup device having a plurality of high-sensitivity pixel devices that receive a relatively large amount of light and a plurality of low-sensitivity pixel devices that receive a relatively small amount of light, the high-sensitivity pixel devices and the low-sensitivity pixel devices being arranged in an array;
an exposure control unit configured to independently control an exposure period of the high-sensitivity pixel devices and an exposure period of the low-sensitivity pixel devices, the high-sensitivity pixel devices and the low-sensitivity pixel devices being included in the image pickup device;
an image generation unit configured to perform image generation processing on the basis of a signal output from the image pickup device, and
wherein the image generation unit performs comparison processing of a high-sensitivity pixel evaluation image generated using data output from the high-sensitivity pixel devices and a low-sensitivity pixel evaluation image generated using data output from the low-sensitivity pixel devices by obtaining a difference or ratio between a pixel value of each pixel included in the high-sensitivity pixel evaluation image and a pixel value of a corresponding pixel included in the low-sensitivity pixel evaluation image, discriminates a pixel region composed of pixels each having a small difference between corresponding pixels in the two evaluation images from a pixel region composed of pixels each having a large difference between corresponding pixels in the two evaluation images, and performs different types of image processing for the pixel regions.

2. The image pickup apparatus according to claim 1, wherein the image generation unit generates an image for the pixel region composed of pixels each having a small difference between corresponding pixels in the two evaluation images by performing image processing using both of the data output from the high-sensitivity pixel devices and the data output from the low-sensitivity pixel devices, and generates an image for the pixel region composed of pixels each having a large difference between corresponding pixels in the two evaluation images by performing image processing using only one of the data output from the high-sensitivity pixel devices and the data output from the low-sensitivity pixel devices.

3. The image pickup apparatus according to claim 1, wherein each of the low-sensitivity pixel devices included in the image pickup device is configured to receive light in an R, G, or B specific wavelength range, and each of the high-sensitivity pixel devices included in the image pickup device is configured to receive light in a visible light range, and wherein, when it is assumed that an evaluation image generated using data output from the low-sensitivity pixel devices is a low-sensitivity pixel evaluation image WL and an evaluation image generated using data output from the high-sensitivity pixel devices is a high-sensitivity pixel evaluation image WH, the image generation unit generates the low-sensitivity pixel evaluation image WL on the basis of equation WL=aR+bG+cB, where coefficients a, b, and c function as parameters and are determined in accordance with characteristics of the image pickup device.

4. The image pickup apparatus according to claim 3, wherein the image generation unit determines values of the parameters in accordance with a light source.

5. The image pickup apparatus according to claim 1, wherein the image generation unit compares an absolute value |E| of a difference between pixel values of corresponding pixels in the high-sensitivity pixel evaluation image and the low-sensitivity pixel evaluation image with a predetermined threshold value, and performs different types of image processing for a pixel region composed of pixels each having a pixel value difference larger than the threshold value and a pixel region composed of pixels each having a pixel value difference equal to or smaller than the threshold value.

6. The image pickup apparatus according to claim 1, wherein the image generation unit compares an absolute value |E| of a difference between pixel values of corresponding pixels in the high-sensitivity pixel evaluation image and the low-sensitivity pixel evaluation image with a plurality of predetermined threshold values, and performs different types of image processing in accordance with degrees of difference among a pixel value difference and the threshold values.

7. The image pickup apparatus according to claim 6, wherein the image generation unit performs different types of image processing in accordance with degrees of difference among a pixel value difference and the threshold values by using the data output from the high-sensitivity pixel devices and the data output from the low-sensitivity pixel devices at different ratios.

8. The image pickup apparatus according to claim 1, wherein the image generation unit removes high-frequency components from the high-sensitivity pixel evaluation image and the low-sensitivity pixel evaluation image prior to the comparison processing of them.

9. The image pickup apparatus according to claim 1, wherein the image generation unit generates an image for a pixel region composed of a pixel having a large difference between pixel values of corresponding pixels in the two evaluation images and pixels around the pixel by performing image processing using only one of the data output from the high-sensitivity pixel devices and the data output from the low-sensitivity pixel devices.

10. The image pickup apparatus according to claim 1, wherein the image generation unit performs comparison processing of the high-sensitivity pixel evaluation image generated using data that has yet to be subjected to interpolation processing and the low-sensitivity pixel evaluation image generated using data that has yet to be subjected to interpolation processing.

11. The image pickup apparatus according to any one of claims 1 to 10, wherein the high-sensitivity pixel devices included in the image pickup device receive visible light and invisible light such as infrared light.

12. An image processing method of performing image processing in an image pickup apparatus, comprising the steps of:

using an image pickup device having a plurality of high-sensitivity pixel devices that receive a relatively large amount of light and a plurality of low-sensitivity pixel devices that receive a relatively small amount of light, independently controlling an exposure period of the high-sensitivity pixel devices and an exposure period of the low-sensitivity pixel devices at the time of image capturing, and inputting an image capturing signal output from the image pickup device into an image generation unit;

causing the image generation unit to perform comparison processing of a high-sensitivity pixel evaluation image generated using data output from the high-sensitivity pixel devices and a low-sensitivity pixel evaluation image generated using data output from the low-sensitivity pixel devices by obtaining a difference or ratio between a pixel value of each pixel included in the high-sensitivity pixel evaluation image and a pixel value of a corresponding pixel included in the low-sensitivity pixel evaluation image; and causing the image generation unit to discriminate a pixel region composed of pixels each having a small difference between corresponding pixels in the two evaluation images from a pixel region composed of pixels each having a large difference between corresponding pixels in the two evaluation images, and perform different types of image processing for the pixel regions.

13. The image processing method according to claim 12, wherein image processing is performed for the pixel region composed of pixels each having a small difference between corresponding pixels in the two evaluation images using both of the data output from the high-sensitivity pixel devices and the data output from the low-sensitivity pixel devices, and image processing is performed for the pixel region composed of pixels each having a large difference between corresponding pixels in the two evaluation images using only one of the data output from the high-sensitivity pixel devices and the data output from the low-sensitivity pixel devices.

14. The image processing method according to claim 12, wherein each of the low-sensitivity pixel devices included in the image pickup device is configured to receive light in an R, G, or B specific wavelength range, and each of the high-sensitivity pixel devices included in the image pickup device is configured to receive light in a visible light range, and wherein, when it is assumed that an evaluation image generated using data output from the low-sensitivity pixel devices is a low-sensitivity pixel evaluation image WL and an evaluation image generated using data output from the high-sensitivity pixel devices is a high-sensitivity pixel evaluation image WH, the image generation unit generates the low-sensitivity pixel evaluation image WL on the basis of equation WL=aR+bG+cB, where coefficients a, b, and c function as parameters and are determined in accordance with characteristics of the image pickup device.

15. The image processing method according to claim 14, wherein the image generation unit determines values of the parameters in accordance with a light source so as to generate the low-sensitivity pixel evaluation image WL.

16. The image processing method according to claim 12, wherein an absolute value |E| of a difference between pixel values of corresponding pixels in the high-sensitivity pixel evaluation image and the low-sensitivity pixel evaluation image is compared with a predetermined threshold value, and different types of image processing is performed for a pixel region composed of pixels each having a pixel value difference larger than the threshold value and a pixel region composed of pixels each having a pixel value difference equal to or smaller than the threshold value.

17. The image processing method according to claim 12, wherein an absolute value |E| of a difference between pixel values of corresponding pixels in the high-sensitivity pixel evaluation image and the low-sensitivity pixel evaluation image is compared with a plurality of predetermined threshold values, and different types of image processing is performed in accordance with degrees of difference among a pixel value difference and the threshold values.

18. The image processing method according to claim 17, wherein different types of image processing is performed in accordance with degrees of difference among a pixel value difference and the threshold values by using the data output from the high-sensitivity pixel devices and the data output from the low-sensitivity pixel devices at different ratios.

19. The image processing method according to claim 12, wherein high-frequency components are removed from the high-sensitivity pixel evaluation image and the low-sensitivity pixel evaluation image prior to the comparison processing of them.

20. The image processing method according to claim 12, wherein image generation processing is performed for a pixel region composed of a pixel having a large difference between pixel values of corresponding pixels in the two evaluation images and pixels around the pixel by performing image processing using only one of the data output from the high-sensitivity pixel devices and the data output from the low-sensitivity pixel devices.

21. The image processing method according to claim 12, wherein comparison processing of the high-sensitivity pixel evaluation image generated using data that has yet to be subjected to interpolation processing and the low-sensitivity pixel evaluation image generated using data that has yet to be subjected to interpolation processing is performed.

22. The image processing method according to any one of claims 12 to 21, wherein the high-sensitivity pixel devices included in the image pickup device receive visible light and invisible light such as infrared light.

23. A non-transitory computer readable medium comprising a computer program causing an image pickup apparatus to perform image processing comprising the steps of:
under the control of a control unit, using an image pickup device having a plurality of high-sensitivity pixel devices that receive a relatively large amount of light and a plurality of low-sensitivity pixel devices that receive a relatively small amount of light, independently controlling an exposure period of the high-sensitivity pixel devices and an exposure period of the low-sensitivity pixel devices at the time of image capturing, and inputting an image capturing signal output from the image pickup device into an image generation unit;
causing the image generation unit to perform comparison processing of a high-sensitivity pixel evaluation image generated using data output from the high-sensitivity pixel devices and a low-sensitivity pixel evaluation image generated using data output from the low-sensitivity pixel devices by obtaining a difference or ratio between a pixel value of each pixel included in the high-sensitivity pixel evaluation image and a pixel value of a corresponding pixel included in the low-sensitivity pixel evaluation image; and
causing the image generation unit to discriminate a pixel region composed of pixels each having a small difference between corresponding pixels in the two evaluation images from a pixel region composed of pixels each having a large difference between corresponding pixels in the two evaluation images, and perform different types of image processing for the pixel regions.

* * * * *